(12) United States Patent
Datta et al.

(10) Patent No.: US 8,389,452 B2
(45) Date of Patent: Mar. 5, 2013

(54) POLYMERIC COMPOSITIONS USEFUL AS RHEOLOGY MODIFIERS AND METHODS FOR MAKING SUCH COMPOSITIONS

(75) Inventors: Sudhin Datta, Houston, TX (US); Jo Ann Marie Canich, Houston, TX (US); Liehpao Oscar Farng, Lawrenceville, NJ (US); Rainer Kolb, Kingwood, TX (US); Vera Minak-Bernero, Bridgewater, NJ (US); Eric B. Sirota, Flemington, NJ (US); Thomas Tungshi Sun, Clinton, NJ (US); Mun Fu Tse, Seabrook, TX (US); Manika Varma-Nair, Warren, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 281 days.

(21) Appl. No.: 12/762,096

(22) Filed: Apr. 16, 2010

(65) Prior Publication Data
US 2010/0273693 A1  Oct. 28, 2010

Related U.S. Application Data

(60) Provisional application No. 61/173,528, filed on Apr. 28, 2009, provisional application No. 61/173,501, filed on Apr. 28, 2009, provisional application No. 61/299,816, filed on Jan. 29, 2010, provisional application No. 61/297,621, filed on Jan. 22, 2010.

(51) Int. Cl.
*C10L 1/16* (2006.01)
*C08G 63/48* (2006.01)
(52) U.S. Cl. .......................................... 508/591; 525/70
(58) Field of Classification Search .................. 508/591; 525/70
See application file for complete search history.

(56) References Cited

U.S. PATENT DOCUMENTS

| | | | |
|---|---|---|---|
| 1,969,324 A | 8/1934 | Poulter | |
| 2,969,324 A | 1/1961 | Knapp et al. | |
| 3,760,001 A | 9/1973 | Staendeke | |
| 3,778,375 A | 12/1973 | Braid et al. | |
| 3,779,928 A | 12/1973 | Schlicht | |
| 3,852,205 A | 12/1974 | Kablaoui et al. | |
| 3,879,306 A | 4/1975 | Kablaoui et al. | |
| 3,932,290 A | 1/1976 | Koch et al. | |
| 3,933,659 A | 1/1976 | Lyle et al. | |
| 4,028,258 A | 6/1977 | Kablaoui et al. | |
| 4,105,571 A | 8/1978 | Shaub et al. | |
| 4,176,074 A | 11/1979 | Coupland et al. | |
| 4,344,853 A | 8/1982 | Gutierrez et al. | |
| 4,464,493 A | 8/1984 | Joffrion | |
| 4,540,753 A | 9/1985 | Cozewith et al. | |

(Continued)

FOREIGN PATENT DOCUMENTS

| EP | 0 277 003 | 8/1988 |
|---|---|---|
| EP | 0 277 004 | 8/1988 |

(Continued)

OTHER PUBLICATIONS

L. Wild et al., "*Determination of Branching Distributions in Polyethylene and Ethylene Copolymers*", J. Poly. Sci., Poly. Phys. Ed., 1982, vol. 20, pp. 441-455.

(Continued)

*Primary Examiner* — Walter D Griffin
*Assistant Examiner* — Francis C Campanell

(57) ABSTRACT

Disclosed are rheology modifiers comprising compositionally disperse polymeric compositions and/or crystallinity disperse polymeric compositions that may be useful in modifying the rheological properties of lubrication fluids, and methods for making such compositions. The compositionally disperse polymeric composition are formed from at least two discrete compositions of ethylene copolymers. The crystallinity disperse polymeric composition are formed from ethylene copolymers having at least two discrete values of residual crystallinity.

25 Claims, 2 Drawing Sheets

U.S. PATENT DOCUMENTS

| | | | |
|---|---|---|---|
| 4,542,199 A | 9/1985 | Kaminsky et al. | |
| 4,752,597 A | 6/1988 | Turner | |
| 4,792,595 A | 12/1988 | Cozewith et al. | |
| 4,804,794 A | 2/1989 | Ver Strate et al. | |
| 4,871,705 A | 10/1989 | Hoel | |
| 4,892,851 A | 1/1990 | Ewen et al. | |
| 4,959,436 A | 9/1990 | Cozewith et al. | |
| 5,008,204 A | 4/1991 | Stehling | |
| 5,017,714 A | 5/1991 | Welborn, Jr. | |
| 5,026,798 A | 6/1991 | Canich | |
| 5,055,438 A | 10/1991 | Canich | |
| 5,068,047 A | 11/1991 | Chung et al. | |
| 5,096,867 A | 3/1992 | Canich | |
| 5,120,867 A | 6/1992 | Welborn, Jr. | |
| 5,132,262 A | 7/1992 | Rieger et al. | |
| 5,132,281 A | 7/1992 | Chevallier et al. | |
| 5,151,080 A | 9/1992 | Bick | |
| 5,151,204 A | 9/1992 | Struglinski | |
| 5,153,157 A | 10/1992 | Hlatky et al. | |
| 5,155,080 A | 10/1992 | Elder et al. | |
| 5,198,401 A | 3/1993 | Turner et al. | |
| 5,243,001 A | 9/1993 | Winter et al. | |
| 5,264,405 A | 11/1993 | Canich | |
| 5,278,119 A | 1/1994 | Turner et al. | |
| 5,278,264 A | 1/1994 | Spaleck et al. | |
| 5,296,434 A | 3/1994 | Karl et al. | |
| 5,304,614 A | 4/1994 | Winter et al. | |
| 5,318,935 A | 6/1994 | Canich et al. | |
| 5,324,800 A | 6/1994 | Welborn, Jr. et al. | |
| 5,382,630 A | 1/1995 | Stehling et al. | |
| 5,387,568 A | 2/1995 | Ewen et al. | |
| 5,391,617 A | 2/1995 | Olivier et al. | |
| 5,391,629 A | 2/1995 | Turner et al. | |
| 5,446,221 A | 8/1995 | Struglinski | |
| 5,451,630 A | 9/1995 | Olivier et al. | |
| 5,451,636 A * | 9/1995 | Olivier et al. | 525/72 |
| 5,621,126 A | 4/1997 | Canich et al. | |
| 5,665,800 A | 9/1997 | Lai et al. | |
| 5,955,625 A | 9/1999 | Canich | |
| 5,969,070 A | 10/1999 | Waymouth et al. | |
| 6,034,187 A | 3/2000 | Maehama et al. | |
| 6,265,338 B1 | 7/2001 | Canich | |
| RE37,400 E | 10/2001 | Canich | |
| 6,319,998 B1 * | 11/2001 | Cozewith et al. | 526/65 |
| 6,376,409 B1 | 4/2002 | Burkhardt et al. | |
| 6,376,412 B1 | 4/2002 | Burkhardt et al. | |
| 6,380,120 B1 | 4/2002 | Burkhardt et al. | |
| RE37,788 E | 7/2002 | Canich | |
| 6,525,007 B2 | 2/2003 | Okada et al. | |
| 6,589,920 B2 | 7/2003 | Okada et al. | |
| 6,638,887 B1 | 10/2003 | Canich | |
| 6,753,381 B2 * | 6/2004 | Mishra et al. | 525/240 |
| 6,881,800 B2 | 4/2005 | Friedersdorf | |
| 7,053,153 B2 | 5/2006 | Schauder | |
| 7,163,907 B1 | 1/2007 | Canich et al. | |
| 7,232,871 B2 | 6/2007 | Datta et al. | |
| 7,402,235 B2 | 7/2008 | Huang | |
| 7,569,646 B1 | 8/2009 | Canich | |
| 2002/0055445 A1 | 5/2002 | Okada et al. | |
| 2003/0176579 A1 | 9/2003 | Mishra et al. | |
| 2004/0121922 A1 | 6/2004 | Okada et al. | |
| 2007/0167315 A1 | 7/2007 | Arriola et al. | |
| 2009/0209721 A1 | 8/2009 | Ikeda et al. | |
| 2010/0273693 A1 | 10/2010 | Datta et al. | |

FOREIGN PATENT DOCUMENTS

| | | |
|---|---|---|
| EP | 0 287 239 | 10/1988 |
| EP | 0 426 637 | 5/1991 |
| EP | 0 427 697 | 5/1991 |
| EP | 0 495 375 | 7/1992 |
| EP | 0 500 944 | 9/1992 |
| EP | 0 511 665 | 11/1992 |
| EP | 0 520 732 | 12/1992 |
| EP | 0 570 982 | 11/1993 |
| EP | 0 573 403 | 12/1993 |
| EP | 0 577 581 | 1/1994 |
| EP | 0 578 838 | 1/1994 |
| EP | 0 612 768 | 8/1994 |
| EP | 0 637 611 | 2/1995 |
| EP | 0 638 611 | 2/1995 |
| EP | 1 148 115 | 10/2001 |
| EP | 1 178 102 | 2/2002 |
| EP | 1 262 498 | 12/2002 |
| WO | WO 92/00333 | 1/1992 |
| WO | WO 93/10495 | 5/1993 |
| WO | WO 93/19103 | 9/1993 |
| WO | WO 99/07788 | 2/1999 |
| WO | WO 99/29743 | 6/1999 |
| WO | WO 99/45062 | 9/1999 |
| WO | WO 99/60033 | 11/1999 |
| WO | WO 01/48034 | 7/2001 |
| WO | WO 03/040201 | 5/2003 |
| WO | WO 2006/102146 | 9/2006 |
| WO | WO 2009/012153 | 1/2009 |
| WO | WO 2010/126721 | 11/2010 |

OTHER PUBLICATIONS

H. N. Cheng et al., "$^{13}C$ *NMR Analysis of Compositional Heterogeneity in Ethylene-Propylene Copolymers*", Macromolecules, 1991, vol. 24, Issue 8, pp. 1724-1726.

C. Cozewith, "*Interpretation of $^{13}C$ NMR Sequence Distribution for Ethylene-Propylene Copolymers Made with Heterogeneous Catalysts*", Macromolecules, 1987, vol. 20, Issue 6, pp. 1237-1244.

M. Kakugo et al., "$^{13}C$ *NMR Determination of Monomer Sequence Distribution in Ethylene-Propylene Copolymers Prepared with $\delta$-$TiCl_3$—$Al(C_2H_5)_2Cl$*", Macromolecules, 1982, vol. 15, Issue 4, pp. 1150-1152.

C. Cozewith et al., "*Ethylene-Propylene Copolymers. Reactivity Ratios, Evaluation, and Significance*", Macromolecules, 1971, vol. 4, Issue 4, pp. 482-489.

J. C. Randall, "*Methylene Sequence Distributions and Number Average Sequence Lengths in Ethylene-Propylene Copolymers*", Macromolecules, 1978, vol. 11, Issue 1, pp. 33-36.

H. N. Cheng, "$^{13}C$ *NMR Analysis of Ethylene-Propylene Rubbers*", Macromolecules, 1984, vol. 17, Issue 10, pp. 1950-1955.

G. J. Ray et al., "*Carbon-13 Nuclear Magnetic Resonance Determination of Monomer Composition and Sequence Distributions in Ethylene-propylene Copolymers Prepared with a Stereoregular Catalyst System*", Macromolecules, 1977, vol. 10 Issue 4, pp. 773-778.

T. Sun et al., "*A Study of the Separation Principle in Size Exclusion Chromatography*", Macromolecules, 2004, vol. 37, Issue 11, pp. 4304-4312.

T. Sun et al., "*Effect of Short Chain Branching on the Coil Dimensions of Polyolefins in Dilute Solution*", Macromolecules, 2001, vol. 34, Issue 19, pp. 6812-6820.

W. Spaleck et al., "*The Influence of Aromatic Substituents on the Polymerization Behavior of Bridged Zirconocene Catalysts*", Organometallics, 1994, vol. 13, pp. 954-963.

H. Brintzinger et al., "*ansa-Zirconocene Polymerization Catalysts with Annelated Ring Ligands—Effects on Catalytic Activity and Polymer Chain Length*", Organometallics, 1994, vol. 13, pp. 964-970.

A. C. Ouano, "*Gel Permeation Chromatography*", Polymer Molecular Weights Part II, ed. P. E. Slade, Marcel Dekker, Inc., NY 1975, pp. 287-368.

F. Rodriguez, "*The Molecular Weight of Polymers*", Principles of Polymer Systems $3^{rd}$ ed., Hemisphere Pub. Corp., NY, 1989, pp. 155-160.

G. Ver Strate et al., "*Near Monodisperse Ethylene-Propylene Copolymers by Direct Ziegler-Natta Polymerization. Preparation, Characterization, Properties*", Macromolecules, 1988, vol. 21, pp. 3360-3371.

U.S. Appl. No. 60/243,192, "*Processes and Apparatus for Continuous Solution Polymerization*", filed Oct. 25, 2000.

Wittig, H. et al., "Über neue Triaryl-bor-Ver-bindungen und ihre Tetraarylo-borat-Komplexe (V. Mitteil.[1])," Chemische Berichte, 1955, vol. 88, pp. 962-976.

* cited by examiner

POLYMERIC COMPOSITIONS USEFUL AS RHEOLOGY MODIFIERS AND METHODS FOR MAKING SUCH COMPOSITIONS

US PRIORITY

This application claims the priority to and the benefit from U.S. Ser. No. 61/173,528, filed on Apr. 28, 2009, U.S. Ser. No. 61/173,501, filed on Apr. 28, 2009, and U.S. Ser. No. 12/569,009, filed on Sep. 29, 2009, all of which are incorporated herein by reference in their entirety.

CROSS REFERENCE TO RELATED APPLICATIONS

This application is related to U.S. Ser. No. 61/299,816, filed on Jan. 29, 2010, and U.S. Ser. No. 61/297,621, filed on Jan. 22, 2010, which are herein incorporated by reference in their entirety.

FIELD OF THE INVENTION

The present invention relates to polymeric compositions useful as rheology modifiers and methods for making such compositions. More particularly, the invention relates to compositionally disperse polymeric compositions and/or crystallinity disperse polymeric compositions that are useful in modifying the rheological properties of fluids, and methods for making such compositions.

BACKGROUND OF THE INVENTION

Lubrication fluids are applied between moving surfaces to reduce the friction between such surfaces, thereby improving efficiency and reducing wear. Lubrication fluids also often function to dissipate the heat generated by the moving surfaces.

One type of lubrication fluid is a petroleum-based lubrication oil used for internal combustion engines. Lubrication oils contain additives which help the lubrication oil to have a certain viscosity at a given temperature. In general, the viscosity of lubrication oils and fluids are inversely dependent upon temperature. When the temperature of lubrication fluids is increased, the viscosity of such fluids generally decreases, and when the temperature is decreased, the viscosity of such fluids generally increases. For internal combustion engines, for example, it is desirable to have lower viscosity at low temperatures to facilitate engine starting during cold weather, and a higher viscosity at higher ambient temperatures when lubrication properties typically decline.

Such additives for lubrication fluids and oils include rheology modifiers, including viscosity index (VI) improvers. VI improving components, derived from ethylene-alpha-olefin copolymers, modify the rheological behavior to increase the lubricant viscosity, and promote a more constant viscosity over the range of temperatures over which the lubricant is used. Higher ethylene content copolymers efficiently promote oil thickening and shear stability. However, higher ethylene content copolymers tend to flocculate or aggregate from oil formulations. This typically happens at ambient or subambient conditions of controlled and quiescent cooling. This deleterious property of otherwise advantageous higher ethylene content viscosity improvers is measured by low temperature solution rheology. Various remedies have been proposed for these higher ethylene content copolymer formulations to overcome or mitigate this propensity towards the formation of high viscosity flocculated materials.

Conventional vanadium-based Ziegler-Natta catalysts are typically most useful in polymerizing copolymers composed of ethylene and propylene only. While copolymers of ethylene and higher alpha-olefins, such as butene, may be produced, such copolymers are limited to those having higher ethylene content.

Metallocene-based catalysts may be used to produce higher-alpha olefin content in VI improvers, as noted in U.S. Pat. Nos. 6,525,007 and 5,446,221, which are incorporated herein by reference.

The performance of VI improvers can be substantially improved, as measured by the thickening efficiency (TE) and the shear stability index (SSI), by appropriate and careful manipulation of the structure of the VI improver. We have discovered that such performance improves when the distribution of the monomers and the chain architecture are controlled and segregated into at least two compositionally disperse and/or crystallinity disperse polymeric populations. These disperse polymeric populations may be achieved by the use of a special synthesis process that employ metallocene-based catalysts in the polymerization process.

Metallocene-based catalysts used in continuous feed stirred tank reactor lead to ethylene copolymers which are compositionally narrow and have a most probable narrow distribution in molecular weight. Such a concomitant distribution of molecular weight and composition would be characterized as a discrete component of the VI improver.

One solution proposed is the use of blends of amorphous and semi-crystalline ethylene copolymers for lubricant oil formulations. The combination of two such ethylene-propylene copolymers allows for increased TE, SSI, low temperature viscosity performance and pour point. See, e.g., U.S. Pat. Nos. 7,402,235 and 5,391,617, and European Patent No. 0 638,611, the disclosures of which are incorporated herein by reference.

We have found that, contrary to the teachings in the art, there is a preferred relationship between the amount, composition and molecular weight of the discrete distributions of the ethylene-based alpha-olefin copolymers used in the polymeric blends for VI improvers. This relationship leads to ethylene-based alpha-olefin copolymers which have a controlled population of monomers such that it has a superior performance in the TE at a predetermined SSI. The choice of the alpha-olefin (e.g., propylene or butene) will affect other properties of the rheology modifier such as solubility parameter, TE and SSI. It is believed that the addition of alpha-olefins may in addition lead to a further degree of control in the polymer chain such that the level of crystallinity will be diminished and thus the fluidity of the solutions containing the polymers will be enhanced.

There remains a need, however, for novel rheology modifier compositions comprised of ethylene and alpha-olefin-based comonomers suitable for use in VI improvers which have unexpectedly high TE as compared to the prior compositions while still being equivalent in their beneficial low temperature solution rheology properties. This invention meets this and other needs.

SUMMARY OF THE INVENTION

In one aspect, the invention relates to a polymeric composition comprising:
(a) a first ethylene copolymer having:
   i. an $E_A$ in the range from greater than or equal to 35 to less than or equal to 60; and
   ii. a $Mw_A$ of less than or equal to 130,000;

(b) a second ethylene copolymer having:
  i. an $E_B$ in the range from greater than or equal to 35 to less than or equal to 85; and
  ii. a $Mw_B$ of less than 70,000.

In another aspect, the invention relates to a polymeric composition comprising:
(a) a first ethylene copolymer having:
  i. an $H_A$ in the range from greater than or equal to 0 to less than or equal to 30; and
  ii. a $Mw_A$ of less than 130,000;
(b) a second ethylene copolymer having:
  i. an $H_B$ in the range from greater than 30 to less than or equal to 60; and
  ii. a $Mw_B$ of less than or equal to 70,000.

In some embodiments, the polymeric composition has one or more of the following properties:
  i. an $E_A$ less than $E_B$;
  ii. an $H_A$ less than $H_B$;
  iii. a $MI_A/MI_B$ less than or equal to 3.0; and
  iv. the weight percent of the first ethylene copolymer is greater than the weight percent of the second ethylene copolymer in the polymeric composition.

In some embodiments of the polymeric composition, the first and the second ethylene copolymers each comprise ethylene and one or more comonomers. The comonomers may be independently selected from the group consisting of alpha-olefins and mixtures thereof. The alpha-olefins may be independently selected from the group consisting of a $C_3$ to $C_{20}$ alpha-olefins and mixtures thereof.

In another aspect, the invention relates to a lubrication oil composition comprising:
(a) a lubrication oil basestock; and
(b) any one of the polymeric compositions of this invention.

In another aspect, the invention relates to a process for making a polymeric composition comprising the steps of: (a) copolymerizing ethylene and a first comonomer component in the presence of a first metallocene catalyst in a first polymerization reaction zone under first polymerization conditions to produce a first effluent comprising a first ethylene copolymer of the invention; (b) copolymerizing ethylene and a second comonomer component in the presence of a second metallocene catalyst in a second polymerization reaction zone under second polymerization conditions to produce a second effluent comprising a second ethylene copolymer of the invention; and (c) forming a polymeric composition of the invention, wherein the first and second polymerization conditions are independently selected from the group consisting of slurry phase, solution phase and bulk phase; and wherein the first and second polymerization reaction zones are in series, in parallel or the same.

DETAILED DESCRIPTION OF THE INVENTION

Figure 1:
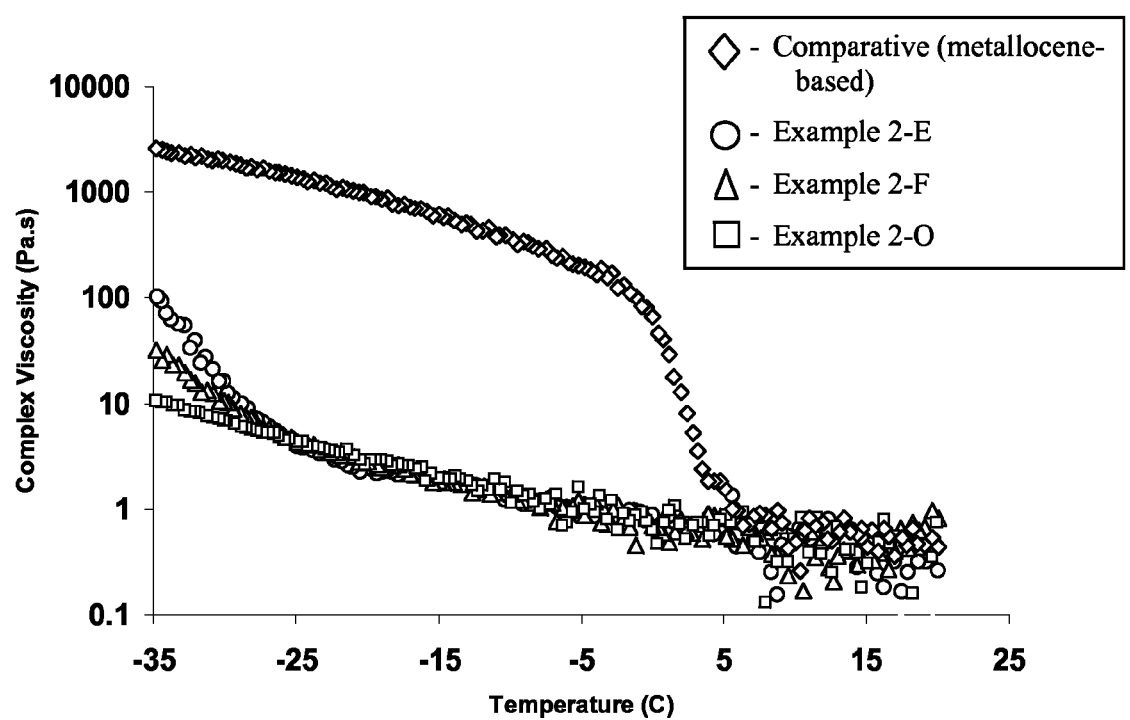
FIG. 1 displays complex viscosity as a function of temperature for the inventive and comparative polymeric compositions in PAO-4 lubrication basestock at a concentration of 2.5 wt. % from an Anton-Parr rheometer.

The present invention relates to polymeric compositions useful as rheology modifiers comprising polymeric compositions, including, but not limited to, compositionally disperse polymeric compositions and/or crystallinity disperse polymeric compositions that are useful in modifying the rheological properties of lubrication fluids. The compositionally disperse polymeric composition are formed from at least two discrete compositions of ethylene copolymers. The crystallinity disperse polymeric composition are formed from ethylene copolymers having at least two discrete values of residual crystallinity. The invention also relates to methods of making such compositions.

The performance of ethylene-based rheology modifiers as VI improvers is measured by the ratio of the TE to the SSI. It is generally believed that the composition of the olefin copolymer at a given SSI largely determines the TE, and that higher ethylene content is preferred because of its TE. While increasing ethylene content of rheology modifiers leads to improved TE/SSI ratios, it also leads to increasing crystallinity of the olefin copolymer. Increasing crystallinity, however, detracts from the performance or the rheology modifier as a VI improver because crystalline polymers tend to flocculate, either by themselves or in association with other components of the lubrication oil and precipitate out of the lubrication oils. These precipitates are apparent as regions (e.g., "lumps") of high viscosity or essentially complete solidification (e.g., "gels") and can lead to clogs and blockages of pumps and other passageways for the lubrication fluid and can lead to harm and in some causes failure of moving machinery.

While not being bound by any particular theory, it is believed that these rheology modifiers for lubrication fluids comprising polymeric compositions which are compositionally disperse and/or crystallinity disperse will be less prone to the deleterious effects of macroscopic crystallization in dilute solution as measured by the change in the rheology of the fluid solution compared to an equivalent amount of a single ethylene copolymers of the same average composition as the compositionally disperse blend. It is also believed that these compositionally and/or crystallinity disperse polymers will have lower crystallization on cooling from ambient to sub-ambient temperatures, resulting in better low temperature flow properties in solution as compared to equivalent compositionally uniform polymers of similar molecular weight and TE. These polymeric compositions and their use in lubrication oil compositions with basestocks can be distinguished from other compositionally monodisperse olefin copolymers by physical separation of the compositionally disperse polymer into components as well as by a higher ratio of the melting point by DSC to the heat of fusion than would be observed for a monodisperse polymer of the same average ethylene content, melt viscosity and composition.

Dilute solutions of these inventive rheology modifiers display a higher TE and lower shear stability than their comparatives at the similar average composition which do not follow the invention process. The rheology modifiers have a far superior low temperature performance as measured by reduced viscosity of the solutions at low temperature.

It is within the scope of the invention to have an unequal amount of the internal olefin in each of the ethylene copolymer components such that there is a preponderance of the internal olefin in the higher ethylene copolymer component. In the limit, the invention would lead to negligible amounts of internal olefin in the low ethylene copolymer component, and mostly all of the internal olefin in the higher ethylene copolymer component.

Definitions

For purposes of this inventions and the claims thereto, the definitions set forth below are used.

As used herein, the term "complex viscosity" means a frequency-dependent viscosity function determined during forced small amplitude harmonic oscillation of shear stress, in units of Pascal-seconds, that is equal to the difference between the dynamic viscosity and the out-of-phase viscosity (imaginary part of complex viscosity).

As used herein, the term "Composition Distribution Breadth Index" (CDBI) is defined in U.S. Pat. No. 5,382,630, which is hereby incorporated by reference. CDBI is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in L. Wild, et al., entitled "Determination of Branching Distributions in Polyethylene and Ethylene Copolymers," *Journal of Polymer Science: Polymer Physics Edition*, Vol. 20, pp. 441 (1982) and U.S. Pat. No. 5,008,204, which are incorporated herein by reference.

As used herein, the term "crystallinity disperse" means a polymeric composition comprised of at least two ethylene-based copolymers having two discrete values of residual crystallinity.

As used herein, the term "copolymer" includes any polymer having two or more monomers.

As used herein, the term "crystallinity disperse" means a polymeric composition comprised of at least two ethylene-based copolymers having two discrete values of residual crystallinity.

As used herein, the term "disperse" means that the compositions include constituent polymer fractions which have different compositions and/or different crystallinity due, in part, to different molecular weight distributions, and/or different monomer compositional or sequence distributions.

As used herein, the term "$E_A$" means the weight percent of ethylene-derived units of the first ethylene copolymer based on the weight of the polymeric composition.

As used herein, the term "$E_B$" means the weight percent of ethylene-derived units of the second ethylene copolymer based on the weight of the polymeric composition.

As used herein, the term "ethylene copolymer" means an ethylene-based copolymer comprised of ethylene and one or more comonomers.

As used herein, the term "$H_A$" means the heat of fusion in units of joules/gram on a first melt of the first ethylene copolymer.

As used herein, the term "$H_B$" means the heat of fusion in units of joules/gram on the first melt of the second ethylene copolymer.

As used herein, the term "intermolecular composition distribution" (InterCD or intermolecular CD), i.e., a measure of compositional heterogeneity, defines the compositional heterogeneity in terms of ethylene content, among polymer chains. It is expressed as the minimum deviation, analogous to a standard deviation, in terms of weight percent ethylene from the average ethylene composition for a given copolymer sample needed to include a given weight percent of the total copolymer sample which is obtained by excluding equal weight fractions from both ends of the distribution. The deviation need not be symmetrical. When expressed as a single number, for example, an intermolecular composition distribution of 15 wt. % shall mean the larger of the positive or negative deviations. For example, at 50 wt. % intermolecular composition distribution the measurement is akin to conventional composition distribution breadth index.

As used herein, the term "intramolecular composition distribution" (IntraCD or intramolecular CD) defines the compositional variation, in terms of ethylene, within a copolymer chain. It is expressed as the ratio of the alpha-olefin to ethylene along the segments of the same chain.

As used herein, the term "$MI_A$" means the melt index in units of g/10 min or dg/min of the first ethylene copolymer.

As used herein, the term "$MI_B$" means the melt index in units of g/10 min or dg/min of the second ethylene copolymer.

As used herein, the term "$Mn_A$" means the number-average molecular weight of the first ethylene copolymer as measured by GPC.

As used herein, the term "$Mn_B$" means the number-average molecular weight of the second ethylene copolymer as measured by GPC.

As used herein, the term "$Mw_A$" means the weight-average molecular weight of the first ethylene copolymer in units of grams/mole in terms of polystyrene, as measured by GPC.

As used herein, the term "$Mw_B$" means the weight-average molecular weight of the second ethylene copolymer in units of grams/mole in terms of polystyrene, as measured by GPC.

As used herein, the term "MWD" means the ratio of Mw to Mn.

As used herein, the term "melting point" means the highest peak among principal and secondary melting peaks as determined by DSC during the second melt, as discussed herein.

As used herein, the term "mostly all" of the internal olefin is intended to mean greater than 90 wt. % of the total amount of the internal olefin contained in the higher ethylene copolymer component, and greater than 5 wt. % of the total amount of the internal olefin contained in the higher ethylene copolymer component.

As used herein, the term "negligible amount" is intended to mean less than 10 wt. % of the total amount of the internal olefin contained in the polymeric composition, and less than 2 wt. % of the total amount of internal olefin contained in the low ethylene copolymer component.

As used herein, the term "polyene" means monomers or polymers having two or more unsaturations, i.e., dienes, trienes, and the like.

As used herein, the term "polypropylene" means a polymer made of at least 50% propylene units, preferably at least 70% propylene units, more preferably at least 80% propylene units, even more preferably at least 90% propylene units, even more preferably at least 95% propylene units, or 100% propylene units.

As used herein, the term "substantially linear structure" means that the first ethylene copolymer and/or the second ethylene copolymer is characterized as having less than 1 branch point pendant with a carbon chain larger than 19 carbon atoms per 200 carbon atoms along a backbone.

When a polymer or copolymer is referred to as comprising an olefin, including, but not limited to ethylene, propylene, and butene, the olefin present in such polymer or copolymer is the polymerized form of the olefin.

Polymeric Compositions

In one aspect of the invention, the rheology modifiers for lubrication fluids comprise compositionally disperse polymeric compositions and crystallinity disperse polymeric compositions. These polymeric compositions comprise a first ethylene copolymer blended with a second ethylene copolymer. Unless otherwise specified, all references to first ethylene copolymer and second ethylene copolymer refer to both the compositionally disperse polymeric compositions and crystallinity disperse polymeric compositions.

The first ethylene copolymer having relatively lower ethylene content is a copolymer of ethylene, an alpha-olefin comonomer, and optionally an internal olefin and optionally a polyene, such as a diene.

The second ethylene copolymer having relatively higher ethylene-content copolymer is a copolymer of ethylene, an internal olefin, an alpha-olefin and optionally a polyene such as a diene.

The referenced polymeric composition comprises a first ethylene copolymer, preferably at least 51 wt. % of a first ethylene copolymer based on the weight of the polymeric composition, and a second ethylene copolymer, preferably 49 wt. % or less of a second ethylene copolymer based on the weight of the polymeric composition. In some embodiments, the first ethylene copolymer comprises 60 wt. % of the first ethylene copolymer and 40 wt. % of the second ethylene copolymer of the polymeric composition; in other embodiments, the first ethylene copolymer comprises 70 wt. % of the first ethylene copolymer and 30 wt. % of the second ethylene copolymer of the polymeric composition; in still other embodiments, the first ethylene copolymer comprises 80 wt. % of the first ethylene copolymer and 20 wt. % of the second ethylene copolymer of the polymeric composition; in still yet other embodiments, the first ethylene copolymer comprises 90 wt. % of the first ethylene copolymer and 10 wt. % of the second ethylene copolymer of the polymeric composition.

In some embodiments of the compositionally disperse and/or crystallinity disperse polymeric composition, the weight percent of the first ethylene copolymer in the polymeric composition is greater than the weight percent of the second ethylene copolymer in the polymeric composition.

For compositionally disperse polymeric compositions, the first ethylene copolymer is characterized by ethylene weight percent ($E_A$).

For crystallinity disperse polymeric compositions, the first ethylene copolymer is characterized by a heat of fusion ($H_A$).

The first ethylene copolymer may be further characterized by a melt index ($MI_A$), a number-average molecular weight ($Mn_A$), and a weight-average molecular weight ($Mw_A$).

The $E_A$ of the first ethylene copolymer is in the range of $35 \leq E_A \leq 65$; in some embodiments, in the range of $40 \leq E_A \leq 60$; in other embodiments, in the range of $45 \leq E_A \leq 55$; and in still yet other embodiments $E_A$ is about 50.

The $H_A$ of the first ethylene copolymer is in the range of $0 \leq H_A \leq 30$; in some embodiments, in the range of $0 \leq H_A \leq 15$; in other embodiments, in the range of $0 \leq H_A \leq 10$; in still other embodiments, in the range of $0 \leq H_A \leq 5$; and in still yet other embodiments, $H_A$ is about 2.

The first ethylene copolymer may be characterized by a weight-average molecular weight ($Mw_A$) of less than or equal to 130,000, or less than 120,000, or less than 110,000, or less than 100,000, or less than 90,000, or less than 80,000, or less than 70,000. Preferably, the $Mw_A$ is from 70,000 to 95,000.

The first and/or second ethylene copolymers may be characterized by a molecular weight distribution (MWD). The first and/or second ethylene copolymer has a MWD of less than 3.0, or less than 2.4, or less than 2.2, or less than 2.0. Preferably, the MWD for the first ethylene copolymer and/or the second ethylene copolymer is in the range of greater than or equal to 1.80 to less than or equal to 1.95.

For compositionally disperse polymeric compositions, the second ethylene copolymer is characterized by ethylene weight percent ($E_B$).

For crystallinity disperse polymeric compositions, the second ethylene copolymer is characterized by a heat of fusion ($H_B$).

The $E_B$ of the second ethylene copolymer is in the range of $35 \leq E_B \leq 85$; in some embodiments, in the range of $40 \leq E_B \leq 80$; in other embodiments, in the range of $45 \leq E_B \leq 75$; in still other embodiments, in the range of $50 \leq E_B \leq 70$; and still yet other embodiments, $55 \leq E_B \leq 65$; and still yet other embodiments, $E_B$ is about 60.

The $H_B$ of the second ethylene copolymer is in the range of $30 < H_B \leq 60$; in some embodiments, in the range of $35 < H_B \leq 55$; in other embodiments, in the range of $40 < H_B \leq 50$; and still yet other embodiments, $H_B$ is 45.

The second ethylene copolymer may be characterized by a weight-average molecular weight ($Mw_B$) of less than or equal to 75,000, or less than 70,000, or less than 65,000. Preferably, the $Mw_A$ is from 65,000 to 75,000.

In some embodiments of the compositionally disperse polymeric composition, the ethylene weight percent $E_A$ of the first ethylene copolymer may be less than the ethylene weight percent $E_B$ of the second ethylene copolymer for the polymeric composition.

In some embodiments, the compositionally disperse polymeric compositions may be characterized by the difference in the ethylene weight percent, $E_B$ and $E_A$. In some embodiments, $E_B - E_A \geq 5$; in other embodiments, $E_B - E_A \geq 10$; in still other embodiments, $E_B - E_A \geq 15$; in still yet other embodiments, $E_B - E_A \geq 20$. In some embodiments, the difference in ethylene weight percent, $E_B$ and $E_A$, is in the range of $8 \leq E_B - E_A \leq 10$; in other embodiments, the difference in $E_B$ and $E_A$ is 9.

In some embodiments of the crystallinity disperse polymeric compositions, the heat of fusion $H_A$ of the first ethylene copolymer may be less than the heat of fusion $H_B$ of the second ethylene copolymer.

In some embodiments, the crystallinity disperse polymeric compositions may be characterized by the difference in the heat of fusion, $H_B$ and $H_A$. In some embodiments, $H_B - H_A \geq 4$; in other embodiments, $H_B - H_A \geq 8$; in still other embodiments, $H_B - H_A \geq 12$; in still yet other embodiments, $H_B - H_A \geq 16$. In some embodiments, the difference in the heat of fusion, $H_B$ and $H_A$, is in the range of $8 \leq H_B - H_A \leq 10$; in other embodiments, the difference in $H_B$ and $H_A$ is 9.

The compositionally disperse and/or crystallinity disperse polymeric composition may be further characterized by the ratio $MI_A/MI_B$. In some embodiments, $MI_A/MI_B$ is less than or equal to 3, less than or equal to 2, less than or equal to 1.

The compositionally disperse and/or crystallinity disperse polymeric compositions may be further characterized by the absolute value of the difference in the melt index of the first ethylene copolymer $MI_A$ and the melt index of the second ethylene copolymer $MI_B$. In some embodiments, $|MI_A - MI_B| \leq 3.0$; in other embodiments, $|MI_A - MI_B| \leq 2.5$; in still yet other embodiments, $|MI_A - MI_B| \leq 2.0$; in still yet other embodiments, $|MI_A - MI_B| \leq 1.5$; and still yet other embodiments, $|MI_A - MI_B| \leq 1.1$; and still yet other embodiments, $|MI_A"MI_B| \leq 1.0$.

The MFR of the compositionally disperse and/or crystallinity disperse polymeric compositions will be intermediate to the MFR of the lower and higher ethylene content copolymers when these copolymers have different MFRs. The lower ethylene content copolymer can have an MFR of from 0.2 to 25. The higher ethylene content copolymer can have an MFR of from 0.2 to 25.

The first and/or second ethylene copolymers each comprise ethylene and one or more comonomers. Preferably, the comonomer is independently selected from the group consisting of alpha-olefins and mixtures thereof. Preferably, the alpha-olefins are independently selected from the group consisting of a $C_3$ to $C_{20}$ alpha-olefins and mixtures thereof. Preferably, the comonomer is propylene, butene, hexene, octene or mixtures thereof.

In some embodiments, the comonomer of the first and the second ethylene copolymers further comprises a polyene monomer. In such embodiments, the compositionally disperse and crystallinity disperse polymeric composition further comprises up to 5 mole %; up to 4 mole %.; up to 3 mole %, up to 2 mole %, and up to 1 mole % polyene-derived units.

In some embodiments, the first ethylene copolymer and/or the second ethylene copolymer comprises one or more polymer fractions having a different $Mn_A$, a different $Mw_A$, or a different $Mw_A/Mn_A$ distribution; $Mn_A$ is the number-average molecular weight of the first ethylene copolymer, and $Mw_A$ is the weight-average molecular weight of the first ethylene copolymer.

In some embodiments, the rheology modifier has first ethylene copolymer and/or the second copolymer polymer fractions having different comonomer insertion sequences.

In some embodiments, the first or second ethylene copolymer of the compositionally disperse polymeric composition has a substantially linear structure.

The substantially linear structure of the first ethylene copolymer and/or the second ethylene copolymer has less than 1 branch point pendant with a carbon chain larger than 19 carbon atoms per 200 carbon atoms along a backbone, less than 1 branch point pendant with a carbon chain larger than 19 carbon atoms per 300 branch points, less than 1 branch point pendant with a carbon chain larger than 19 carbon atoms per 500 carbon atoms and preferably less than 1 branch point pendant with a carbon chain larger than 19 carbon atoms per 1000 carbon atoms notwithstanding the presence of branch points due to incorporation of the comonomer.

Comonomer Components

In embodiments of this invention, suitable comonomers include, but are not limited to, propylene ($C_3$) and other alpha-olefins, such as $C_4$ to $C_{20}$ alpha-olefins (also referred to herein as "α-olefins"), and preferably propylene and $C_4$ to $C_{12}$ α-olefins. The α-olefin comonomer can be linear or branched, and two or more comonomers can be used, if desired. Thus, reference herein to "an alpha-olefin comonomer" includes one, two, or more alpha-olefin comonomers.

Examples of suitable comonomers include propylene, linear $C_4$ to $C_{12}$ α-olefins, and α-olefins having one or more $C_1$ to $C_3$ alkyl branches. Specific examples include: propylene; 1-butene; 3-methyl-1-butene; 3,3-dimethyl-1-butene; 1-pentene; 1-pentene with one or more methyl, ethyl, or propyl substituents; 1-hexene with one or more methyl, ethyl, or propyl substituents; 1-heptene with one or more methyl, ethyl, or propyl substituents; 1-octene with one or more methyl, ethyl, or propyl substituents; 1-nonene with one or more methyl, ethyl, or propyl substituents; ethyl, methyl, or dimethyl-substituted 1-decene, or 1-dodecene. Preferred comonomers include: propylene; 1-butene; 1-pentene; 3-methyl-1-butene; 1-hexene; 3-methyl-1-pentene; 4-methyl-1-pentene; 3,3-dimethyl-1-butene; 1-heptene; 1-hexene with a methyl substituents on any of $C_3$ to $C_5$; 1-pentene with two methyl substituents in any stoichiometrically acceptable combination on $C_3$ or $C_4$; 3-ethyl-1-pentene, 1-octene, 1-pentene with a methyl substituents on any of $C_3$ or $C_4$; 1-hexene with two methyl substituents in any stoichiometrically acceptable combination on $C_3$ to $C_5$; 1-pentene with three methyl substituents in any stoichiometrically acceptable combination on $C_3$ or $C_4$; 1-hexene with an ethyl substituents on $C_3$ or $C_4$; 1-pentene with an ethyl substituents on $C_3$ and a methyl substituents in a stoichiometrically acceptable position on $C_3$ or $C_4$; 1-decene, 1-nonene, 1-nonene with a methyl substituents on any of $C_3$ to $C_9$; 1-octene with two methyl substituents in any stoichiometrically acceptable combination on $C_3$ to $C_7$; 1-heptene with three methyl substituents in any stoichiometrically acceptable combination on $C_3$ to $C_6$; 1-octene with an ethyl substituents on any of $C_3$ to $C_7$; 1-hexene with two ethyl substituents in any stoichiometrically acceptable combination on $C_3$ or $C_4$; and 1-dodecene.

Polyene Components

The polyenes particularly useful as co-monomers are non-conjugated dienes, preferably they are straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6; (c) single ring alicyclic dienes, such as 1,4-cyclohexadiene; 1,5-cyclo-octadiene and 1,7-cyclododecadiene; (d) multi-ring alicyclic fused and bridged ring dienes, such as: tetrahydroindene, norbornadiene, methyl-tetrahydroindene, dicyclopentadiene (DCPD), bicyclo-(2.2.1)-hepta-2,5-diene, alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene; and vinyl cyclododecene. Of the non-conjugated dienes typically used, the preferred dienes are dicyclopentadiene (DCPD), 1,4-hexadiene, 1,6-octadiene; 5-methyl-1,4-hexadiene; 3,7-dimethyl-1,6-octadiene; 5-methylene-2-norbornene, 5-ethylidene-2-norbornene (ENB), and tetracyclo (Δ-11,12) 5,8 dodecene. It is preferred to use dienes which do not lead to the formation of long chain branches. For successful use as rheology modifiers, such as VI improver non- or lowly branched polymer chains are preferred. Other polyenes that can be used include cyclopentadiene and octatetra-ene; and the like.

Polymerization Process

In another aspect, the present invention is directed to a polymerization process for making rheology modifiers comprised of compositionally disperse polymer compositions and/or crystallinity disperse polymeric compositions.

In some embodiments of this invention, the process for making a rheology modifier composition for lubrication fluids comprising a compositionally disperse polymeric composition or a crystallinity disperse polymeric composition comprises the steps of:

(a) copolymerizing ethylene and a first comonomer component in the presence of a first metallocene catalyst in a first polymerization reaction zone under first polymerization conditions to produce a first effluent comprising any one of the first ethylene copolymers of this invention;

(b) copolymerizing ethylene and a second comonomer component in the presence of a second metallocene catalyst in a second polymerization reaction zone under second polymerization conditions to produce a second effluent comprising any one of the second ethylene copolymers of this invention; and (c) forming any one of the polymeric compositions of this invention.

In one or more embodiments, the first and second polymerization conditions of the invention are independently selected from the group consisting of slurry phase, solution phase and bulk phase. When the first and second polymerization conditions are solution phase, and the forming step (c) comprises the substantial removal of the solvent from the second effluent to produce a solid polymeric composition.

In one embodiment, separate polymerizations may be performed in parallel with the effluent polymer solutions from two reactors combined downstream before the finishing. In another embodiment, separate polymerizations may be performed in series, where the effluent of one reactor is fed to the next reactor. In still another embodiment, the separate polymerization may be performed in the same reactor, preferably in sequential polymerizations.

In a preferred embodiment, ethylene copolymers are polymerized by a metallocene catalyst, to form the first ethylene copolymer in one reactor and the second ethylene copolymer in another reactor. The ethylene copolymers are combined and then subjected to finishing steps to produce a solid polymeric composition. The first ethylene copolymer can be made first; alternatively, the second ethylene copolymer can be made first in a series reactor configuration or both ethylene copolymers can be made simultaneously in a parallel reactor configuration.

Each polymerization reaction is preferably carried out in a continuous flow, stirred tank reactor. When polymerizing in a series reactor layout, the polymeric product emerging from the second reactor is an intimate blend of the first ethylene copolymer and the second ethylene copolymer.

Particular reactor configurations and processes suitable for use in the processes of the present invention are described in detail in U.S. Pat. Nos. 6,319,998, and 6,881,800, the disclosures of which are incorporated herein by reference. The later developments of the general approach is to separately polymerize the two copolymers in an alkane solvent, either hexane in a solution process or propylene in a slurry process, and to finish the polymers to remove the solvent.

The metallocene catalysts, and their use with non-coordinating ions and non-ionic activators used in the polymerization process, are taught in U.S. Provisional Patent App. No. 61/173,528, incorporated herein by reference.

Examples of suitable bis-cyclopentadienyl metallocenes, include, but are not limited to, the type disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference.

Lubrication Oil Composition

The lubrication oil composition according to the invention comprises a lubrication oil basestock and any one of the compositionally disperse polymeric composition of this invention and/or any one of the crystallinity disperse polymeric composition of this invention, an optionally, a pour point depressant. In some embodiments, such lubrication oil compositions have the following properties:
(a) a thickening efficiency greater than 1.5, or greater than 1.7, or greater than 1.9, or greater than 2.2, or greater than 2.4 or greater than 2.6;
(b) a shear stability index less than 55, or less than 45, or less than 35, or less than 30, or less than 25, or less than 20, or less than 15; and/or
(c) a complex viscosity at −35° C. of less than 500, or less than 450, or less than 300, or less than 100, or less than 50, or less than 20, or less than 10 centistokes (cSt).

The lubrication oil composition preferably comprises 2.5 wt. %, or 1.5 wt. %, or 1.0 wt. % or 0.5 wt. % of the compositionally disperse and/or crystallinity disperse polymeric composition.

The components for forming the lubrication oil basestock are described below.

Lubrication Oil Basestock

Examples of the lubrication oil bases for use in the invention include, but are not limited to, mineral oils and synthetic oils such as poly-α-olefins, polyol esters and polyalkylene glycols. A mineral oil or a blend of a mineral oil and synthetic oil is preferably employed. The mineral oil is generally used after subjected to purification such as dewaxing.

Although mineral oils are divided into several classes according to the purification method, generally used is a mineral oil having a wax content of 0.5 to 10%. Further, a mineral oil having a kinematic viscosity of 10 to 200 cSt is generally used.

Lubricant Formulations

In one embodiment, the polymeric composition is used as a VI improver for an oil composition. The polymer composition has solubility in oil of at least 10 wt. %. From 0.001 to 49 wt. % of this composition is incorporated into basestock oil, such as lubrication oil or a hydrocarbon fuel, depending upon whether the desired product is a finished product or an additive concentrate. The amount of the VI improver is an amount which is effective to improve or modify the VI of the basestock oil, i.e., a viscosity improving effective amount. Generally, this amount is from 0.001 to 20 wt. % for a finished product (e.g., a fully formulated lubrication oil composition), with alternative lower limits of 0.01%, 0.1% or 1%, and alternative upper limits of 15% or 10%, in other embodiments. Ranges of VI improver concentration from any of the recited lower limits to any of the recited upper limits are within the scope of the present invention, and one skilled in the art can readily determine the appropriate concentration range based upon the ultimate solution properties.

Basestock oils suitable for use in preparing the lubrication compositions of the present invention include those conventionally employed as crankcase lubrication oils for spark-ignited and compression-ignited internal combustion engines, such as automobile and truck engines, marine and railroad diesel engines, and the like. Advantageous results are also achieved by employing the VI improver compositions of the present invention in basestock oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubrication oil compositions can also benefit from the incorporation therein of the additives of the present invention.

The lubrication oils to which the products of this invention can be added include not only hydrocarbon oils derived from petroleum, but also include synthetic lubrication oils such as esters of dibasic acids; complex esters made by etherification of monobasic acids, polyglycols, dibasic acids and alcohols; polyolefin oils, etc. Thus, the VI improver compositions of the present invention may be suitably incorporated into synthetic basestock oils such as alkyl esters of dicarboxylic acids, polyglycols and alcohols; polyalpha-olefins; polybutenes; alkyl benzenes; organic esters of phosphoric acids; polysilicone oils; etc. The VI compositions of the present invention can also be utilized in a concentrate form, such as from 1 wt. % to 49 wt. % in oil, e.g., mineral lubrication oil, for ease of handling, and may be prepared in this form by carrying out the reaction of the invention in oil as previously described.

The above oil compositions may optionally contain other conventional additives, such as, for example, pour point depressants, antiwear agents, antioxidants, other viscosity-index improvers, dispersants, corrosion inhibitors, anti-foaming agents, detergents, rust inhibitors, friction modifiers, and the like.

Compositions when containing these conventional additives are typically blended into the basestock oil in amounts which are effective to provide their normal attendant function. Thus, typical formulations can include, in amounts by weight, a VI improver of the present invention (0.01-12%); a corrosion inhibitor (0.01-5%); an oxidation inhibitor (0.01-5%); depressant (0.01-5%); an anti-foaming agent (0.001-3%); an anti-wear agent (0.001-5%); a friction modifier (0.01-5%); a detergent/rust inhibitor (0.01-10%); and an oil basestock.

When other additives are used, it may be desirable, although not necessary, to prepare additive concentrates comprising concentrated solutions or dispersions of the VI improver (in concentrate amounts hereinabove described), together with one or more of the other additives, such a concentrate denoted an "additive package," whereby several additives can be added simultaneously to the basestock oil to form a lubrication oil composition. Dissolution of the additive concentrate into the lubrication oil may be facilitated by solvents and by mixing accompanied with mild heating, but this is not essential. The additive-package will typically be formulated to contain the VI improver and optional additional additives in proper amounts to provide the desired concentration in the final formulation when the additive-package is combined with a predetermined amount of base lubricant. Thus, the products of the present invention can be added to small amounts of basestock oil or other compatible solvents along with other desirable additives to form additive-packages containing active ingredients in collective amounts of typically from 2.5 to 90 wt. %, preferably from 5 to 75 wt. %, and still more preferably from 8 to 50 wt. % additives in the appropriate proportions with the remainder being basestock oil.

The final formulations may use typically about 10 wt. % of the additive-package with the remainder being basestock oil.

Blending with Basestock Oils

Conventional blending methods are described in U.S. Pat. No. 4,464,493, the disclosure of which is incorporated herein by reference. This conventional process requires passing the polymer through an extruder at elevated temperature for degradation of the polymer and circulating hot oil across the die face of the extruder while reducing the degraded polymer to particle size upon issuance from the extruder and into the hot oil. The pelletized, solid polymer compositions of the present invention, as described above, can be added by blending directly with the basestock oil so as give directly viscosity for the VI improver, so that the complex multi-step process of the prior art is not needed. The solid polymer composition can be dissolved in the basestock oil without the need for additional shearing and degradation processes.

The polymer compositions will be soluble at room temperature in lube oils at up to 10 percent concentration in order to prepare a viscosity modifier concentrate. Such concentrate, including eventually an additional additive package including the typical additives used in lube oil application as described above, is generally further diluted to the final concentration (usually around 1%) by multi-grade lube oil producers. In this case, the concentrate will be a pourable homogeneous solid free solution.

The polymer compositions preferably have a SSI (determined according to ASTM D97) of from 10 to 50.

Specific Embodiments

Specific numbered embodiments of the invention can further include:

Embodiment 1: A polymeric composition comprising: (a) a first ethylene copolymer having: (i) an intermolecular composition distribution of greater than or equal to 50, 40, 30, 20, 10 or 5 wt. %; and (ii) a substantially linear structure; and (b) a second ethylene copolymer having: (i) an intermolecular composition distribution of less than or equal to 50, 40, 30, 20, 10 or 5 wt. %; and (ii) a substantially linear structure.

Embodiment 2: A polymeric composition for lubrication fluids comprising: (a) a first ethylene copolymer having: (i) an intermolecular composition distribution of greater than or equal to 50, 40, 30, 20, 10 or 5 wt. %; (ii) a substantially linear structure; and (b) a second ethylene copolymer having: (i) an intramolecular composition distribution of less than or equal to 50, 40, 30, 20, 10 or 5 wt. %; and (ii) a substantially linear structure.

Embodiment 3: A polymeric composition comprising: (a) a first ethylene copolymer having: (i) an intramolecular composition distribution of greater than or equal to 50, 40, 30, 20, 10 or 5 wt. %; (ii) a substantially linear structure; and (b) a second ethylene copolymer having: (i) an intermolecular composition distribution of less than or equal to 50, 40, 30, 20, or 5 wt. %; and (ii) a substantially linear structure.

Embodiment 4: A polymeric composition comprising: (a) a first ethylene copolymer having: (i) an intramolecular composition distribution of greater than or equal to 50, 40, 30, 20, 10, or 5 wt. %, (ii) a substantially linear structure; and (b) a second ethylene copolymer having: (i) an intramolecular composition distribution of less than or equal to 50, 40, 30, 20, or 5 wt. %, and (ii) a substantially linear structure.

Embodiment 5: The polymeric composition of Embodiments 1 to 4, wherein the ethylene content of the first ethylene copolymer ($E_A$) or the ethylene content of the second ethylene copolymer ($E_B$) is in the range from greater than or equal to 35 to less than or equal to 85 based on the weight of the polymeric composition.

Embodiment 6: The polymeric composition of Embodiments 1 to 4, wherein the absolute value of the difference between $E_B$ and $E_A$ is greater than or equal to 5 wt. %.

Embodiment 7: The polymeric composition of Embodiments 1 to 4, wherein the first ethylene copolymer and/or the second ethylene copolymers each comprises ethylene and a comonomer. The comonomer is independently selected from the group consisting of alpha-olefins and mixtures thereof. The alpha-olefins are independently selected from the group consisting of a $C_3$ to $C_{20}$ alpha-olefins and mixtures thereof. The alpha-olefins are propylene, butene, hexene, octene or mixtures thereof.

Embodiment 8: The polymeric composition of Embodiments 1 to 4, wherein the comonomer of the first and/or the second ethylene copolymers further comprises a polyene monomer, and the polymeric composition further comprises up to 5 mole % polyene-derived units.

Embodiment 9: A lubrication oil composition comprising: (a) a lubrication oil basestock; and (b) any one the Embodiments 1 to 4 of the polymeric composition. The lubrication oil composition having a physical property selected from the group consisting of: (i) a TE of greater than or equal to 1.5; (ii) a SSI of less than 55; and (iii) a complex viscosity at −31° C. of less than or equal to 500 cSt.

Polymer Analyses

The ethylene content as an ethylene weight percent ($C_2$ wt. %) for the ethylene copolymers were determined according to ASTM D1903.

DSC Measurements of the crystallization temperature, $T_c$, and melting temperature, $T_m$, of the ethylene copolymers were measured using a TA Instruments Model 2910 DSC. Typically, 6-10 mg of a polymer was sealed in a pan with a hermetic lid and loaded into the instrument. In a nitrogen environment, the sample was first cooled to $-100°$ C. at $20°$ C./min. It was heated to $220°$ C. at $10°$ C./min and melting data (first heat) were acquired. This provides information on the melting behavior under as-received conditions, which can be influenced by thermal history as well as sample preparation method. The sample was then equilibrated at $220°$ C. to erase its thermal history. Crystallization data (first cool) were acquired by cooling the sample from the melt to $-100°$ C. at $10°$ C./min and equilibrated at $-100°$ C. Finally it was heated again to $220°$ C. at $10°$ C./min to acquire additional melting data (second heat). The endothermic melting transition (first and second heat) and exothermic crystallization transition (first cool) were analyzed for peak temperature and area under the peak. The term "melting point," as used herein, is the highest peak among principal and secondary melting peaks as determined by DSC during the second melt, discussed above. The thermal output is recorded as the area under the melting peak of the sample, which is typically at a maximum peak at about $30°$ C. to about $175°$ C. and occurs between the temperatures of about $0°$ C. and about $200°$ C. The thermal output is measured in Joules as a measure of the heat of fusion. The melting point is recorded as the temperature of the greatest heat absorption within the range of melting of the sample.

Molecular weight (weight-average molecular weight, $M_w$, number-average molecular weight, $M_n$, and molecular weight distribution, $M_w/M_n$ or MWD) were determined using a High Temperature Size Exclusion Chromatograph (either from Waters Corporation or Polymer Laboratories), equipped with a differential refractive index detector (DRI), an online light scattering (LS) detector, and a viscometer. Experimental details not described below, including how the detectors were calibrated, are described in: T. Sun et al., "Effect of Short Chain Branching on the Coil Dimensions of Polyolefins in Dilute Solution," *Macromolecules*, Volume 34, Issue 19, pp. 6812-6820, (2001).

Three Polymer Laboratories PLgel 10 mm Mixed-B columns were used. The nominal flow rate was 0.5 cm$^3$/min, and the nominal injection volume was 300 µL. The various transfer lines, columns and differential refractometer (the DRI detector) were contained in an oven maintained at $145°$ C. Solvent for the SEC experiment was prepared by dissolving 6 grams of butylated hydroxy toluene as an antioxidant in 4 liters of Aldrich reagent grade 1, 2, 4 trichlorobenzene (TCB). The TCB mixture was then filtered through a 0.7 µm glass pre-filter and subsequently through a 0.1 µm Teflon filter. The TCB was then degassed with an online degasser before entering the SEC. Polymer solutions were prepared by placing dry polymer in a glass container, adding the desired amount of TCB, then heating the mixture at $160°$ C. with continuous agitation for about 2 hours. All quantities were measured gravimetrically. The TCB densities used to express the polymer concentration in mass/volume units are 1.463 g/ml at room temperature and 1.324 g/ml at $145°$ C. The injection concentration ranged from 1.0 to 2.0 mg/ml, with lower concentrations being used for higher molecular weight samples. Prior to running each sample the DRI detector and the injector were purged. Flow rate in the apparatus was then increased to 0.5 ml/minute, and the DRI was allowed to stabilize for 8-9 hours before injecting the first sample. The LS laser was turned on 1 to 1.5 hours before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the light scattering (LS) analysis. Units on parameters throughout this description of the SEC method are such that concentration is expressed in g/cm$^3$, molecular weight is expressed in g/mole, and intrinsic viscosity is expressed in dL/g.

The light scattering detector used was a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DR1 analysis, $A_2$ is the second virial coefficient [for purposes of this invention and the claims thereto, $A_2$=0.0006 for propylene polymers and 0.001 otherwise], $P(\theta)$ is the form factor for a monodisperse random coil (M. B. Huglin, Light Scattering from Polymer Solutions, Academic Press, 1971), and $K_o$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at $145°$ C. and $\lambda$=690 nm. For purposes of this invention and the claims thereto (dn/dc)=0.104 for propylene polymers and 0.1 otherwise.

A high temperature Viscotek Corporation viscometer, which has four capillaries arranged in a Wheatstone bridge configuration with two pressure transducers, was used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index (g') is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index g' is defined as:

$$g' = \frac{[\eta]_{avg}}{kM_v^\alpha}$$

where, for purpose of this invention and claims thereto, $\alpha$=0.695 for ethylene, propylene, and butene polymers; and k=0.000579 for ethylene polymers, k=0.000228 for propylene polymers, and k=0.000181 for butene polymers. $M_v$ is the viscosity-average molecular weight based on molecular weights determined by LS analysis.

Anton-Parr Low Temperature Solution Rheology (low temperature rheology) experiments were done on an Anton-Parr Model MCR501 rheometer using a 1" cone and plate setup. The cone has a nominal 1 degree angle and 50 micron gap. About 100 microliters of sample is deposited on the bottom plate using a syringe-pipette. The cone is then lowered onto the plate so that the volume between the cone and plate is fully occupied by solution. The temperature is then lowered at a cooling rate of 1.5° C./min. while measuring the complex viscosity at an angular frequency of 0.1 radians/sec. applying a 10% strain and recording a value every minute. The viscosity at 0.1 rad/sec is then plotted as a function of temperature to observe the effect of gelation.

Melt Index (MI) was measured according to ASTM D1238 at 190° C. under a 2.16 kilogram load.

Melt Flow Rate (MFR) was measured according to ASTM D1238 at 230° C. under a 2.16 kilogram load or a 21.6 kilogram load.

Thickening Efficiency (TE) was determined according to ASTM D445.

Shear Stability index (SSI) was determined according to ASTM D6278 at 30 and 90 passes using a Kurt Ohban machine.

Shear stress data was accomplished by first heating the sample to −15° C., and waiting for 15 minutes. Then while measuring the shear stress, applying a logarithmically increasing strain by varying the shear rate logarithmically from $10^{-3}$ to 10 with 20 points/decade and 1 second per point.

The number of branch points was determined by measuring the radius of gyration of polymers as a function of the molecular weight by the methods of size exclusion chromatography augmented by laser light scattering. These procedures are described in the publications "A Study of the Separation Principle in Size Exclusion Chromatography," by T. Sun et al., in the journal *Macromolecules*, Volume 37, Issue 11, pp. 4304-4312, (2004), and "Effect of Short Chain Branching on the Coil Dimensions of Polyolefins in Dilute Solution" by T. Sun et al., in the journal *Macromolecules*, Volume 34, Issue 19, pp. 6812-6820, (2001), which are both incorporated by reference.

Branching in polymers having narrow, and most probably, low polydispersity index with essentially uniform intramolecular and intermolecular distribution of composition can also be described by the ratio of the TE to the MFR@230° C. measured at a load of 2.16 Kg. High values of this parameter indicate low levels of branching while low levels indicate substantial levels of branching.

Intermolecular composition distribution, unlike CDBI, contemplates weight percent of copolymer content within a smaller range from a median total molar comonomer content, e.g., within 25 wt. % of median. For example, for a Gaussian compositional distribution, 95.5% of the polymer, used herein for this example as "Polymer Fraction", is within 20 wt. % ethylene of the mean if the standard deviation is 10%. The intermolecular composition distribution for the Polymer Fraction is 20 wt. % ethylene for such a sample, i.e., 10% standard deviation yields 20 wt. % intermolecular composition distribution.

Compositional Heterogeneity, both intermolecular-CD and intramolecular-CD can be determined by carbon-13 NMR. Conventional techniques for measuring intermolecular-CD and intramolecular-CD are described in *Macromolecules*, H. N. Cheng et al., entitled "$^{13}$C NMR Analysis of Compositional Heterogeneity in Ethylene-Propylene Copolymers," Volume 24, Issue 8, pp. 1724-1726, (1991), and in the publication *Macromolecules*, C. Cozewith, entitled "Interpretation of $^{13}$C NMR Sequence Distribution for Ethylene-Propylene Copolymers Made with Heterogeneous Catalysts", Volume 20, Issue 6, pp. 1237-1244, (1987).

Generally, conventional carbon-13 NMR measurements of diad and triad distribution is used to characterize the ethylene-based copolymer. Any conventional technique for measuring carbon-13 NMR may be utilized. For example, ethylene-based copolymer samples are dissolved in a solvent, e.g., trichlorobenzene at 4.5 wt. % concentration. The carbon-13 NMR spectra are obtained at elevated temperature, e.g., 140° C., on a NMR spectrometer at 100 MHz. An exemplary spectrometer is a pulsed Fourier transform Varian XL-400 NMR spectrometer. Deuteriated o-dichlorobenezene is placed in a coaxial tube to maintain an internal lock signal. The following instrument conditions are utilized: pulse angle, 75°; pulse delay, 25 second; acquisition time, 0.5 second; sweep width, 16000 Hz. The carbon-13 NMR peak area measurements were determined by spectral integration. Diad and triad concentrations were calculated from the equations presented in *Macromolecules*, Kakugo et al., entitled "$^{13}$C NMR Determination of Monomer Sequence Distribution in Ethylene-Propylene Copolymers Prepared with $\delta$-TiCl$_3$—Al(C$_2$H$_5$)$_2$Cl," Volume 15, Issue 4, pp. 1150-1152, (1982). The diad and triad concentrations were then normalized to give a mole fraction distribution. Polymer composition was calculated from the methane peaks, the methylene peaks, and the diad balance. These values may be considered individually or an average of the three values may be utilized. Unless stated otherwise, this application utilizes an average of these three values. The results are then compared to conventional model equations as disclosed in the above references.

One aspect of these measurements involves the determination of the reactivity ratios ($r_1 r_2$) of the polymerization system for the ethylene-based polymers according to the procedures in the publication. Polymers which have a compositional heterogeneity, either intramolecular or intermolecular, have a much larger reactivity ratio than the polymers which have only a small or negligible amount.

Without being limited to theory or one method of calculation, it is believed that an one exemplary model for, so called ideal copolymerizations, is described by the terminal copolymerization model:

$$m = M(r_1 M + 1)/(r_2 + M) \quad (1)$$

Wherein $r_1$ and $r_2$ are the reactivity ratios, m is the ratio of monomers in the copolymer, $m_1/m_2$, M is the ratio of monomers in the reactor, $M_1/M_2$, and the diad and triad concentrations follow first order Markov statistics. For this model, nine equations are derived that related to the diad and triad concentrations $P_{12}$ and $P_{21}$, the probability of propylene adding to an ethylene-ended chain, and the probability of propylene adding to a propylene-ended chain, respectively. Thus a fit of carbon-13 NMR data to these equations yields $P_{12}$ and $P_{21}$ as the model parameters from which $r_1$ and $r_2$ can be obtained from the relationships:

$$r_1 M = (1 - P_{12})/P_{12}$$

$$r_2/M = (1 - P_{21})/P_{21}$$

The corresponding equations for random copolymerizations with $r_1 r_2 = 1$ can also be used to simplify equation (1), above, to $m=r_1M$. The ethylene fraction in the polymer, E, is equal to $1-P_{12}$. This allows the diad and triad equations to be written in terms of polymer composition:

$$EE=E^2$$

$$EE=2E(1-E)$$

$$PP=(1-E)^2$$

$$EEE=E^3$$

$$EEP=2E^2(1-E)$$

$$EPE=E^2(1-E)$$

$$PEP=E(1-E)^2$$

$$PPE=2E(1-E)^2$$

$$PPP=(1-E)^3$$

Variations and extensions of these equations are provided in the references incorporated herein, including use of catalysts with different active sites, equations for estimating the number of catalyst species present, or complex models such as those with three or more species present, etc.

From these modeling equations, and those equations presented by *Macromolecules*, C. Cozewith et al., entitled "Ethylene-Propylene Copolymers. Reactivity Ratios, Evaluation, and Significance," Volume 4, Issue 4, pp. 482-489, (1971), the average values of $\overline{r_1}$, $\overline{r_2}$, and $\overline{r_1r_2}$ arising from the copolymerization kinetics are given by:

$$\overline{r_1}=(\Sigma r_{1i}f_i/G_i)/(\Sigma f_i/G_i)$$

$$\overline{r_2}=(\Sigma r_{2i}f_i/G_i)/(\Sigma f_i/G_i)$$

$$\overline{r_1r_2}=(\Sigma r_{1i}f_i/G_i)(\Sigma r_{2i}f_i/G_i)/(\Sigma f_i/G_i)^2$$

where $G_i=r_{1i}M\pm 2+r_{2i}/M$

These equations and the models presented in the references cited above may be utilized by those skilled in the art to characterize the ethylene-based copolymer composition distribution.

Further information and techniques for measuring intramolecular-CD are found in *Macromolecules*, Randell, James C., entitled "Methylene Sequence Distributions and Number Average Sequence Lengths in Ethylene-Propylene Copolymers," Volume 11, Issue 1, pp. 33-36, (1978), *Macromolecules*, Cheng, H. N., entitled "$^{13}$C NMR Analysis of Ethylene-Propylene Rubbers," Volume 17, Issue 10, pp. 1950-1955, (1984), and *Macromolecules*, Ray, G. Joseph et al., entitled "Carbon-13 Nuclear Magnetic Resonance Determination of Monomer Composition and Sequence Distributions in Ethylene-Propylene Copolymers Prepared with a Stereoregular Catalyst System," Volume 10, Issue 4, pp. 773-778, (1977), each of which is incorporated by reference in its entirety. Such techniques are readily known to those skilled in the art of analyzing and characterizing olefin polymers.

Temperature Rising Elution Fractionation (TREF). The determination of intermolecular compositional heterogeneity was determined by the fractionation of the EP copolymer carried out by a Polymer Char TREF 200 based on a well-known principle that the solubility of a semi-crystalline copolymer is a strong function of temperature. A corresponding method is described in U.S. Pat. No. 5,008,204. The instrument is a column packed with solid stainless-steel beads. The copolymer of interest was dissolved in 1,2 ortho-dichlorobenzene (oDCB) at 160° C. for 60 min. Half of a milliliter (ml) of the polymer solution (concentration=4-5 mg/ml) was injected in the column and it was stabilized there at 140° C. for 45 min. The solution was cooled from 140° C. to −15° C. at 1° C./min and equilibrated at this temperature for 10 min. This caused the copolymer to crystallize out of the quiescent solution in successive layers of decreasing crystallinity onto the surface of the beads. Pure solvent (oDCB) was pumped for 5 min at −15° C. at a flow rate of 1 ml/min through an infrared detector. A valve was then switched to allow this chilled oDCB to flow through the column at the same flow rate at −15° C. for 10 min. The material eluted was designated as the soluble fraction of the copolymer. At this point, the heater was on and the solvent continued to flow through both the column and the infrared detector while the temperature was programmed upward at a controlled rate of 2° C./min to 140° C. The infrared detector continuously measured the concentration of the copolymer in the effluent from the column, and a continuous solubility distribution curve was obtained.

EXAMPLES

Example 1

Preparation of The Ethylene Propylene Copolymer of Examples 1 and 2

All polymer compositions in Example 1 were synthesized in one continuous stirred tank reactors. The polymerization was performed in solution, using hexane as a solvent. In the reactor, polymerization was performed at a temperature of 110-115° C., an overall pressure of 20 bar and ethylene and propylene feed rates of 1.3 kg/hr and 2 kg/hr, respectively. As catalyst, N,N-dimethylanilinium tetrakis(pentafluorophenyl) boron was used to activate di(p-triethylsilylphenyl)methenyl [(cyclopentadienyl)(2,7-di-tert-butylfluorenyl)]hafnium dimethyl. In the process, hydrogen addition and temperature control were used to achieve the desired MFR. The catalyst, activated externally to the reactor, was added as needed in amounts effective to maintain the target polymerization temperature.

The copolymer solution emerging from the reactor was stopped from further polymerization by addition of water and then devolatilized using conventionally known devolatilization methods such as flashing or liquid phase separation, first by removing the bulk of the hexane to provide a concentrated solution, and then by stripping the remainder of the solvent in anhydrous conditions using a devolatilizer or a twin screw devolatilizing extruder so as to end up with a molten polymer composition containing less than 0.5 wt % of solvent and other volatiles. The molten polymer was cooled until solid.

The composition, melt viscosity and molecular weight properties of the ethylene copolymers of Example 1 are shown in Table I.

TABLE 1

| | Composition Ethylene | Melt viscosity (dg/10 m) MFR @ 230° C. | | GPC Mw (kg/mol) | |
|---|---|---|---|---|---|
| Example | Wt % | 2.16 Kg | 21.6 Kg | Kg/mol | Mw/Mn |
| 1-A | 63.6 | 9.2 | 175 | 82 | 1.84 |
| 1-B | 70.5 | 13 | 238 | 71 | 1.85 |
| 1-C | 59.0 | 15 | 280 | 75 | 1.81 |
| 1-D | 69.2 | 12 | 239 | 71 | 1.87 |
| 1-E | 62.3 | 12 | 259 | 76 | 1.93 |
| 1-F | 74.2 | 15 | 277 | 69 | 1.90 |
| 1-G | 57.3 | 8.0 | 184 | 89 | 1.94 |
| 1-H | 60.7 | 7.9 | 159 | 91 | 1.82 |

The temperature of melting data and heat of fusion for the ethylene copolymers of Example 1 are shown in Table 2.

TABLE 2

| | DSC | | | | | |
|---|---|---|---|---|---|---|
| | 1st melt | | 2nd cool | | 2nd melt | |
| Example | Melting Temp ($T_m$) °C. | Heat of Fusion ($H_f$) J/g | Crystallization Temp ($T_c$) °C. | Heat of Fusion ($H_f$) J/g | Melting Temp ($T_m$) °C. | Heat of Fusion ($H_f$) J/g |
| 1-A | 3.2 | 26 | −2.0 | 29 | −2.5 | 27 |
| 1-B | 24, 46 | 38 | 14 | 41 | 31 | 33 |
| 1-C | −13 | 21 | −16 | 21 | −14 | 17 |
| 1-D | 23, 44 | 41 | 13 | 43 | 27 | 41 |
| 1-E | −3.0 | 28 | −5.7 | 22 | −4.3 | 23 |
| 1-F | 21, 48 | 54 | 18, 26 | 49 | 37 | 48 |
| 1-G | −15 | 18 | −18 | 20 | −17 | 21 |
| 1-H | −9.4 | 21 | −13 | 23 | −11 | 25 |

TABLE 3

| Example | TE* | SSI (KO-30 pass)* (%) |
|---|---|---|
| 1-C | 1.92 | 17.86 |
| 1-D | 2.02 | 15.23 |
| 1-E | 1.99 | 18.26 |
| 1-F | 1.97 | 14.14 |
| 1-G | 2.11 | 23.32 |
| 1-H | 2.15 | 23.4 |

The TE* and SSI* values in Table 3 were measured for a 1 wt. % polymer concentration of the ethylene copolymers of Example 1 in a Americas Core 150 using an ExxonMobil Group I basestock stock with the following lubricant properties: ASTM D445-5, Kinematic viscosity @100° C.=5.189 cSt; ASTM D445-3, Kinematic viscosity @40° C.=29 cSt min.; ASTM D2270 Viscosity index=95 min.; ASTM D92 Flash point COC=210° C. min.; ASTM D97 Pour point=−15° C. max.; and ASTM D5800 Noack volatility=20 wt % max.

Example 2

Table 4 shows the compositionally disperse and crystallinity disperse blends of the ethylene copolymers of Example 1. These disperse blends were made by melt blended, in multiple batches using aliquots of different polymers, at a temperature of 120° C. to 150° C. for 3 to 5 minutes in an Brabender mixer having an internal cavity of 250 ml using low shear blades rotating at speed of 15 to 20 rpm. The ethylene copolymers were protected during the mixing operation by having a nitrogen blanket and by the addition of 1000 ppm of a 3:1 mixture of Irganox 1076 and Irgafos 168 before mixing.

TABLE 4

| | Ethylene Copolymers used to Make Compositionally Disperse and Crystallinity Disperse Polymeric Blends (Parts of Each Copolymer) | | | | | | | |
|---|---|---|---|---|---|---|---|---|
| Example No | Example 1-A | Example 1-B | Example 1-C | Example 1-D | Example 1-E | Example 1-F | Example 1-G | Example 1-H |
| 2-A | | | 210 | 90 | | | | |
| 2-B | | 90 | 210 | | | | | |
| 2-C | 240 | | | 60 | | | | |
| 2-D | 210 | | | 90 | | | | |
| 2-E | 240 | 60 | | | | | | |
| 2-F | 210 | 90 | | | | | | |
| 2-G | 240 | | | | | | 60 | |
| 2-H | 210 | | | | | | 90 | |
| 2-I | | | | 90 | 210 | | | |
| 2-J | | 90 | | | 210 | | | |
| 2-K | | | | | 210 | 90 | | |
| 2-L | | | | 90 | | | | 210 |
| 2-M | | 90 | | | | | | 210 |
| 2-N | | | | | | | 90 | 210 |
| 2-O | | | | 90 | | | 210 | |
| 2-P | | 60 | | | | | 240 | |
| 2-Q | | 90 | | | | | 210 | |
| 2-R | | 120 | | | | | 180 | |
| 2-S | | | | | | | 60 | 240 |
| 2-T | | | | | | | 90 | 210 |
| 2-U | | | 210 | | | 90 | | |
| 2-V | 180 | | | 120 | | | | |
| 2-W | 180 | 120 | | | | | | |
| 2-X | 180 | | | | | 120 | | |

TABLE 4-continued

Ethylene Copolymers used to Make Compositionally Disperse and
Crystallinity Disperse Polymeric Blends
(Parts of Each Copolymer)

| Example No | Example 1-A | Example 1-B | Example 1-C | Example 1-D | Example 1-E | Example 1-F | Example 1-G | Example 1-H |
|---|---|---|---|---|---|---|---|---|
| 2-Y |  |  |  | 60 |  |  | 240 |  |
| 2-Z |  |  |  | 120 |  |  | 180 |  |
| 2-Z1 |  |  |  |  |  | 120 | 180 |  |

The properties of the compositionally and crystallinity disperse blends made in Example 2 are shown in Table 5.

TABLE 5

| | | Melt viscosity (dg/10 m) MFR @ 230° C. | | GPC | |
|---|---|---|---|---|---|
| Example No. | Composition Wt. % C2 | 2.16 Kg | 21.6 Kg | Mw (kg/mol) | Mw/Mn |
| 2-A | 62.5 | 13 | 244 | 76 | 1.84 |
| 2-B | 63.2 | 14 | 275 | 73 | 1.82 |
| 2-C | 65.5 | 9.5 | 210 | 80 | 1.9 |
| 2-D | 65.6 | 9.6 | 211 | 78 | 1.93 |
| 2-E | 65.0 | 9.7 | 198 | 78 | 1.90 |
| 2-F | 65.5 | 10 | 219 | 79 | 1.86 |
| 2-G | 64.7 | 13 | 261 | 74 | 1.89 |
| 2-H | 65.9 | 13 | 258 | 76 | 1.88 |
| 2-I | 64.2 | 11 | 257 | 76 | 1.89 |
| 2-J | 64.4 | 13 | 245 | 75 | 1.87 |
| 2-K | 65.5 |  |  | 76 | 1.93 |
| 2-L | 63.4 | 9.0 | 182 | 83 | 1.93 |
| 2-M | 63.6 | 8.6 | 181 | 81 | 1.96 |
| 2-N | 59.7 | 8.4 | 185 | 86 | 1.85 |
| 2-O | 61.8 | 8.6 | 184 | 84 | 1.93 |
| 2-P | 60.3 | 8.6 | 185 | 86 | 1.90 |
| 2-Q | 62.1 | 9.5 | 195 | 83 | 1.99 |
| 2-R | 63.0 |  |  | 82 | 1.99 |
| 2-S | 60.7 | 8.9 | 195 | 83 | 1.93 |
| 2-T | 62.7 | 11 | 216 | 80 | 1.97 |

The temperature of melting and heat of fusion for the compositionally and crystallinity disperse blends of Example 2 are shown in Table 6.

TABLE 6

| | DSC | | | | | |
|---|---|---|---|---|---|---|
| | 1st melt | | 2nd cool | | 2nd melt | |
| Example No. | Melting Temp (T_m) ° C. | Heat of Fusion (H_f) J/g | Crystallization Temp (T_c) ° C. | Heat of Fusion (H_f) J/g | Melting Temp (T_m) ° C. | Heat of Fusion (H_f) J/g |
| 2-A | 2.6, 51 | 33 | 3.7, −18 | 25 | 33, −4.6 | 37 |
| 2-B | 5.4, 47 | 21 | 7.9, −20 | 26 | 31, −3.7 | 17 |
| 2-C | 11, 46 | 30 | −2.9 | 28 | 4.5 | 27 |
| 2-D | 14, 46 | 32 | 0.6 | 31 | 6.7 | 35 |
| 2-E | 13, 46 | 22 | −2.8 | 33 | 4.1 | 22 |
| 2-F | 16, 46 | 23 | −1.2 | 37 | 8.0 | 27 |
| 2-G | 11, 46 | 32 | 17, −7.6 | 31 | 2.5 | 27 |
| 2-H | 14, 46 | 32 | 20, −7.7 | 31 | 6.6, 48 | 32 |
| 2-I | 9.3, 47 | 29 | −3.9 | 34 | 2.7 | 32 |
| 2-J | 13, 45 | 39 | −6.4 | 40 | −3.3 | 28 |
| 2-K | 14, 47 | 29 | 19, −10 | 32 | 4.6, 48 | 31 |
| 2-L | 2.2, 45 | 36 | −12 | 36 | −2.9 | 25 |
| 2-M | 5.9, 46 | 27 | 8.7, −14 | 29 | 44, −2.3 | 24 |
| 2-N | 48, −7.1 | 26 | 3.9, −23 | 23 | 42, −12 | 22 |
| 2-O | 1.2, 48 | 24 | 4.7, −21 | 23 | 36, −6.2 | 22 |
| 2-P | 47, −8.0 | 26 | 6.5, −23 | 25 | 37, −11 | 22 |
| 2-Q | 2.0, 46 | 20 | 8.7, −23 | 26 | 41, −6.2 | 23 |
| 2-R | 20, 45 | 24 | 8.2, −23 | 33 | 33, −4.5 | 29 |
| 2-S | 45, −7.1 | 16 | 18, −23 | 22 | 44, −11 | 25 |
| 2-T | 2.5, 46 | 29 | 20, −22 | 30 | 45, −6.2 | 30 |

TABLE 7

| Example No. | SSI* (KO-30 Pass) (%) | SSI* (KO-90 Pass) (%) | TE* |
|---|---|---|---|
| 2-A | 10.43 | 13.71 | 1.71 |
| 2-B | 8.89 | 12.15 | 1.72 |
| 2-C | 14.72 | 18.26 | 1.73 |
| 2-D | 14.75 | 18.43 | 1.78 |
| 2-E | 16.01 | 20.07 | 1.93 |
| 2-F | 15.17 | 19.21 | 1.93 |
| 2-G | 12.81 | 16.30 | 1.74 |
| 2-H | 11.85 | 15.70 | 1.72 |
| 2-I | 12.16 | 15.55 | 1.78 |
| 2-J | 11.68 | 15.76 | 1.74 |
| 2-K | 11.45 | 15.27 | 1.73 |
| 2-L | 16.06 | 20.34 | 1.85 |
| 2-M | 17.32 | 21.10 | 1.84 |
| 2-N | 15.65 | 19.70 | 1.84 |
| 2-O | 17.18 | 21.20 | 1.85 |
| 2-P | 16.23 | 20.29 | 1.84 |
| 2-Q | 17.46 | 21.00 | 1.83 |
| 2-R | 16.00 | 19.31 | 1.81 |
| 2-S | 16.95 | 20.72 | 1.84 |
| 2-T | 11.73 | 15.28 | 1.83 |

The SSI* and TE* values in Table 7 were measured for a 1 wt. % polymer concentration of the compositionally and crystallinity disperse blends of Example 2 in PAO-4 which is an ExxonMobil Chemical synthetic basestock stock (SpectraSyn) with the following lubricant properties: ASTM D445-5 Kinematic viscosity @100° C.=4.14 cSt; ASTM D445-3 Kinematic viscosity @40° C.=19 cSt; ASTM D2270 Viscosity index=126; ASTM D92 Flash point COC=220 C min; ASTM D97 Pour point=−66° C.; and ASTM D1298 Specific gravity @15.6/15.6° C.=0.820.

TABLE 8

| Example No. | SSI* (KO-30 Pass) (%) | SSI* (KO-90 Pass) (%) | TE* |
|---|---|---|---|
| 2-A | 17.56 | 21.55 | 1.95 |
| 2-B | 18.41 | 22.57 | 1.96 |
| 2-C | 21.55 | 26.44 | 2.09 |
| 2-D | 21.36 | 26.75 | 2.10 |
| 2-E | 20.32 | 25.31 | 2.12 |
| 2-F | 18.87 | 23.59 | 2.09 |
| 2-G | 18.46 | 23.57 | 1.97 |
| 2-H | 17.02 | 21.91 | 1.98 |
| 2-I | 19.13 | 24.05 | 2.03 |
| 2-J | 16.34 | 20.67 | 1.70 |
| 2-K | 16.34 | 20.23 | 1.99 |
| 2-L | 20.00 | 24.81 | 2.06 |
| 2-M | 22.67 | 27.32 | 2.11 |
| 2-N | 23.28 | 28.33 | 2.10 |
| 2-O | 22.40 | 27.41 | 2.11 |
| 2-P | 23.44 | 28.24 | 2.12 |
| 2-Q | 22.38 | 26.89 | 2.10 |
| 2-R | 20.81 | 25.65 | 2.05 |

TABLE 8-continued

| Example No. | SSI* (KO-30 Pass) (%) | SSI* (KO-90 Pass) (%) | TE* |
|---|---|---|---|
| 2-S | 22.51 | 28.36 | 2.12 |
| 2-T | 21.13 | 26.04 | 2.08 |

The SSI and TE values in Table 8 were measured for a 1 wt. % polymer concentration of the compositionally and crystallinity disperse blends of Example 2 in an Americas Core 150 which is ExxonMobil Group I basestock with the following lubricant properties: ASTM D445-5, Kinematic viscosity @100° C.=5.189 cSt; ASTM D445-3, Kinematic viscosity @40° C.=29 cSt min.; ASTM D2270 Viscosity index=95 min.; ASTM D92 Flash point COC=210° C. min.; ASTM D97 Pour point=−15° C. max.; and ASTM D5800, Noack volatility=20 wt. % max.

The samples of compositionally and crystallinity disperse blends were dissolved in PAO-4 at a concentration of 2.5 wt. % and rheologically tested on the Anton-Parr rheometer as described above at a temperature of 20° C. to −35° C. The complex viscosity data for the disperse blends and a comparative Ziegler-Natta-based polymeric compositions are shown in Tables 9-13. The complex viscosity data for the disperse blends and a metallocene-based polymeric composition is displayed as a function of temperature in FIG. 1.

TABLE 9

| Example 2-A | | Example 2-B | | Example 2-C | | Example 2-D | |
|---|---|---|---|---|---|---|---|
| T C | Complex Viscosity [Pa·s] | T C | Complex Viscosity [Pa·s] | T C | Complex Viscosity [Pa·s] | T C | Complex Viscosity [Pa·s] |
| 20.00 | 1.51 | 20.00 | 0.31 | 20.00 | 0.44 | 20.00 | 0.88 |
| 18.20 | 0.33 | 18.20 | 0.13 | 18.20 | 0.44 | 18.30 | 0.78 |
| 16.60 | 0.45 | 16.60 | 0.26 | 16.60 | 0.37 | 16.60 | 0.42 |
| 15.00 | 0.56 | 15.00 | 0.09 | 15.10 | 0.45 | 15.10 | 0.39 |
| 13.40 | 0.33 | 13.50 | 0.48 | 13.50 | 0.28 | 13.40 | 0.57 |
| 11.80 | 0.46 | 11.90 | 0.46 | 11.90 | 0.41 | 11.90 | 0.91 |
| 10.30 | 0.34 | 10.30 | 0.44 | 10.30 | 0.33 | 10.30 | 0.52 |
| 8.62 | 0.56 | 8.73 | 0.29 | 8.70 | 0.27 | 8.72 | 0.90 |
| 7.09 | 0.85 | 7.11 | 0.41 | 7.14 | 0.49 | 7.11 | 0.84 |
| 5.54 | 0.46 | 5.56 | 0.63 | 5.54 | 0.74 | 5.55 | 0.77 |
| 4.09 | 0.81 | 3.96 | 0.38 | 3.98 | 0.67 | 3.96 | 0.60 |
| 2.33 | 0.89 | 2.36 | 0.28 | 2.43 | 0.79 | 2.37 | 0.77 |
| 0.91 | 0.69 | 0.84 | 0.73 | 0.81 | 0.86 | 0.86 | 1.02 |
| −0.77 | 0.66 | −0.82 | 1.04 | −0.78 | 0.59 | −0.76 | 0.65 |
| −2.39 | 0.67 | −2.40 | 0.66 | −2.35 | 0.85 | −2.44 | 0.88 |
| −3.96 | 0.76 | −3.92 | 1.43 | −3.91 | 0.86 | −3.94 | 0.86 |
| −5.42 | 0.78 | −5.51 | 0.82 | −5.52 | 0.93 | −5.50 | 1.11 |
| −7.06 | 1.12 | −7.07 | 0.94 | −7.14 | 0.80 | −7.14 | 0.81 |
| −8.79 | 1.10 | −8.69 | 1.08 | −8.64 | 1.14 | −8.69 | 1.14 |
| −10.20 | 1.54 | −10.20 | 1.28 | −10.30 | 0.99 | −10.30 | 1.53 |
| −11.80 | 1.53 | −11.90 | 1.68 | −11.90 | 1.37 | −11.80 | 1.33 |
| −13.40 | 1.91 | −13.40 | 1.49 | −13.40 | 1.49 | −13.50 | 1.62 |
| −15.10 | 1.89 | −15.00 | 1.78 | −15.10 | 1.81 | −15.10 | 1.87 |
| −16.60 | 2.24 | −16.60 | 2.05 | −16.60 | 1.45 | −16.70 | 2.01 |
| −18.20 | 2.71 | −18.20 | 2.63 | −18.20 | 2.03 | −18.10 | 2.38 |
| −19.70 | 3.04 | −19.70 | 2.54 | −19.80 | 1.99 | −19.90 | 3.04 |
| −21.30 | 3.53 | −21.40 | 2.94 | −21.30 | 2.56 | −21.30 | 3.14 |
| −22.90 | 3.71 | −22.90 | 3.53 | −22.90 | 2.75 | −23.00 | 3.48 |
| −24.40 | 4.38 | −24.40 | 3.80 | −24.50 | 3.40 | −24.50 | 3.90 |
| −26.20 | 4.71 | −26.10 | 4.51 | −26.20 | 4.22 | −26.10 | 4.98 |
| −27.70 | 5.61 | −27.70 | 4.95 | −27.70 | 5.69 | −27.70 | 6.70 |
| −29.20 | 6.18 | −29.20 | 5.82 | −29.20 | 8.58 | −29.20 | 9.17 |
| −30.80 | 7.14 | −30.90 | 6.30 | −30.80 | 13.00 | −30.90 | 13.40 |
| −32.40 | 8.10 | −32.40 | 7.67 | −32.40 | 23.10 | −32.40 | 16.60 |
| −34.00 | 9.39 | −34.00 | 8.70 | −34.00 | 39.70 | −34.00 | 31.40 |
| −35.10 | 10.50 | −35.20 | 10.10 | −35.20 | 62.80 | −35.20 | 38.00 |

TABLE 10

| Example 2-E | | Example 2-F | | Example 2-G | | Example 2-H | |
|---|---|---|---|---|---|---|---|
| T C | Complex Viscosity [Pa·s] | T C | Complex Viscosity [Pa·s] | T C | Complex Viscosity [Pa·s] | T C | Complex Viscosity [Pa·s] |
| 20.00 | 0.26 | 20.00 | 0.80 | 20.00 | 0.78 | 20.00 | 0.94 |
| 18.20 | 0.43 | 18.30 | 0.75 | 18.30 | 0.30 | 18.30 | 0.26 |
| 16.70 | 0.44 | 16.60 | 0.27 | 16.70 | 0.68 | 16.60 | 0.29 |
| 15.00 | 0.35 | 15.10 | 0.41 | 15.00 | 0.43 | 15.10 | 0.26 |
| 13.50 | 0.69 | 13.40 | 0.41 | 13.40 | 0.30 | 13.50 | 0.62 |
| 11.90 | 0.45 | 11.90 | 0.54 | 11.90 | 0.58 | 11.90 | 0.61 |
| 10.30 | 0.65 | 10.30 | 0.63 | 10.30 | 0.60 | 10.30 | 0.34 |
| 8.73 | 0.15 | 8.74 | 0.37 | 8.67 | 0.39 | 8.72 | 0.44 |
| 7.17 | 0.52 | 7.16 | 0.59 | 7.08 | 0.64 | 7.24 | 0.56 |
| 5.58 | 1.32 | 5.59 | 0.52 | 5.60 | 0.55 | 5.56 | 0.42 |
| 3.98 | 0.82 | 3.91 | 0.90 | 3.92 | 0.77 | 4.00 | 0.72 |
| 2.44 | 0.73 | 2.36 | 0.62 | 2.40 | 0.79 | 2.40 | 0.90 |
| 0.77 | 0.73 | 0.78 | 0.60 | 0.82 | 0.68 | 0.82 | 0.61 |
| −0.80 | 0.93 | −0.79 | 0.94 | −0.79 | 0.65 | −0.76 | 0.81 |
| −2.24 | 0.78 | −2.37 | 1.10 | −2.30 | 0.37 | −2.35 | 0.84 |
| −3.97 | 0.85 | −3.97 | 1.16 | −3.92 | 0.85 | −3.92 | 1.14 |
| −5.51 | 0.92 | −5.55 | 1.06 | −5.51 | 1.09 | −5.54 | 1.09 |
| −7.08 | 1.28 | −7.07 | 1.13 | −7.12 | 0.82 | −7.09 | 1.33 |
| −8.72 | 1.12 | −8.69 | 1.31 | −8.69 | 0.95 | −8.71 | 1.27 |
| −10.30 | 1.22 | −10.40 | 1.42 | −10.30 | 0.91 | −10.20 | 1.32 |
| −11.90 | 1.52 | −11.80 | 1.66 | −11.80 | 1.34 | −11.90 | 1.84 |
| −13.50 | 1.88 | −13.40 | 1.71 | −13.40 | 1.40 | −13.50 | 2.13 |
| −15.00 | 1.75 | −15.00 | 1.87 | −15.00 | 1.77 | −15.00 | 2.05 |
| −16.60 | 2.05 | −16.60 | 2.12 | −16.60 | 1.92 | −16.60 | 2.30 |
| −18.20 | 2.23 | −18.20 | 2.58 | −18.20 | 1.92 | −18.10 | 2.54 |
| −19.70 | 2.44 | −19.90 | 2.84 | −19.70 | 2.25 | −19.80 | 2.86 |
| −21.30 | 2.60 | −21.30 | 3.20 | −21.40 | 2.65 | −21.30 | 3.41 |
| −22.90 | 3.30 | −22.90 | 3.67 | −22.90 | 2.87 | −22.90 | 3.69 |
| −24.50 | 3.76 | −24.50 | 4.22 | −24.50 | 3.22 | −24.50 | 4.30 |
| −26.00 | 5.17 | −26.00 | 5.14 | −26.10 | 3.63 | −26.00 | 4.85 |
| −27.70 | 7.15 | −27.70 | 6.46 | −27.70 | 4.51 | −27.70 | 6.04 |
| −29.40 | 11.20 | −29.40 | 8.99 | −29.30 | 6.19 | −29.30 | 7.26 |
| −30.80 | 21.30 | −30.80 | 12.40 | −30.90 | 9.09 | −30.80 | 9.45 |
| −32.40 | 33.10 | −32.40 | 16.70 | −32.40 | 14.80 | −32.40 | 11.60 |
| −34.00 | 71.70 | −34.00 | 28.70 | −34.10 | 27.30 | −34.00 | 15.30 |
| −35.20 | 102.00 | −35.20 | 38.90 | −35.10 | 41.80 | −35.20 | 21.30 |

TABLE 11

| Example 2-I | | Example 2-J | | Example 2-K* | | Example 2-L | |
|---|---|---|---|---|---|---|---|
| T C | Complex Viscosity [Pa·s] | T C | Complex Viscosity [Pa·s] | T C | Complex Viscosity [Pa·s] | T C | Complex Viscosity [Pa·s] |
| 20.00 | 1.80 | 20.00 | 0.31 | 20.00 | 0.17 | 20.00 | 1.75 |
| 18.20 | 0.52 | 18.30 | 0.19 | 18.20 | 0.05 | 18.30 | 0.40 |
| 16.60 | 0.20 | 16.60 | 0.36 | 16.60 | 0.14 | 16.60 | 0.91 |
| 15.10 | 0.41 | 15.10 | 0.36 | 15.10 | 0.18 | 15.10 | 0.15 |
| 13.50 | 0.46 | 13.50 | 0.41 | 13.40 | 0.23 | 13.40 | 0.66 |
| 11.80 | 0.12 | 11.90 | 0.49 | 11.90 | 0.34 | 11.90 | 0.48 |
| 10.30 | 0.51 | 10.30 | 0.76 | 10.30 | 0.21 | 10.30 | 0.51 |
| 8.75 | 0.39 | 8.73 | 0.30 | 8.73 | 0.18 | 8.70 | 0.62 |
| 7.12 | 0.59 | 7.16 | 0.41 | 7.11 | 0.24 | 7.11 | 0.66 |
| 5.49 | 0.92 | 5.57 | 0.77 | 5.54 | 0.37 | 5.54 | 0.48 |
| 3.98 | 0.87 | 3.92 | 0.51 | 3.93 | 0.25 | 3.99 | 0.58 |
| 2.40 | 0.72 | 2.41 | 0.39 | 2.27 | 0.46 | 2.36 | 0.64 |
| 0.80 | 0.74 | 0.79 | 0.71 | 0.82 | 0.39 | 0.83 | 0.91 |
| −0.78 | 0.51 | −0.76 | 0.79 | −0.76 | 0.19 | −0.78 | 0.63 |
| −2.29 | 0.81 | −2.37 | 0.75 | −2.41 | 0.37 | −2.35 | 0.92 |
| −3.91 | 0.72 | −3.91 | 0.67 | −4.05 | 0.54 | −3.89 | 0.76 |
| −5.61 | 0.78 | −5.50 | 0.94 | −5.49 | 0.39 | −5.41 | 1.28 |
| −7.12 | 0.97 | −7.10 | 1.00 | −7.08 | 0.36 | −7.14 | 1.02 |
| −8.60 | 0.72 | −8.73 | 1.11 | −8.68 | 0.54 | −8.72 | 1.30 |
| −10.30 | 1.36 | −10.30 | 1.61 | −10.30 | 0.45 | −10.30 | 1.49 |
| −11.90 | 1.58 | −11.90 | 1.37 | −11.90 | 0.57 | −11.90 | 1.53 |
| −13.50 | 1.77 | −13.40 | 1.63 | −13.40 | 0.42 | −13.40 | 2.20 |
| −15.10 | 1.78 | −15.00 | 1.98 | −15.00 | 0.73 | −15.00 | 2.09 |
| −16.60 | 1.80 | −16.50 | 2.38 | −16.70 | 0.40 | −16.60 | 2.46 |
| −18.20 | 2.28 | −18.20 | 2.30 | −18.20 | 0.64 | −18.10 | 2.74 |
| −19.70 | 2.46 | −19.70 | 2.44 | −19.70 | 0.80 | −19.80 | 3.12 |

TABLE 11-continued

| Example 2-I | | Example 2-J | | Example 2-K* | | Example 2-L | |
|---|---|---|---|---|---|---|---|
| T C | Complex Viscosity [Pa·s] | T C | Complex Viscosity [Pa·s] | T C | Complex Viscosity [Pa·s] | T C | Complex Viscosity [Pa·s] |
| −21.40 | 2.87 | −21.30 | 2.83 | −21.30 | 0.83 | −21.40 | 3.66 |
| −22.90 | 3.00 | −22.90 | 3.38 | −23.00 | 0.99 | −23.00 | 4.02 |
| −24.50 | 3.27 | −24.50 | 3.89 | −24.50 | 1.07 | −24.40 | 4.49 |
| −26.10 | 3.94 | −26.10 | 4.42 | −26.10 | 1.26 | −26.10 | 5.01 |
| −27.70 | 4.37 | −27.70 | 4.75 | −27.70 | 1.29 | −27.60 | 5.61 |
| −29.30 | 5.14 | −29.20 | 6.19 | −29.30 | 1.42 | −29.20 | 6.59 |
| −30.90 | 6.14 | −30.70 | 7.04 | −30.80 | 1.57 | −30.80 | 7.53 |
| −32.40 | 7.81 | −32.40 | 9.04 | −32.40 | 1.75 | −32.40 | 8.50 |
| −34.00 | 10.80 | −34.00 | 12.20 | −34.00 | 2.13 | −34.10 | 9.67 |
| −35.20 | 12.80 | −35.20 | 16.10 | −35.10 | 2.19 | −35.20 | 11.50 |

*Complex viscosity measured for a 1.0 wt. % concentration in PAO-4.

TABLE 12

| Example 2-M | | Example 2-N | | Example 2-O | | Example 2-P | |
|---|---|---|---|---|---|---|---|
| T C | Complex Viscosity [Pa·s] | T C | Complex Viscosity [Pa·s] | T C | Complex Viscosity [Pa·s] | T C | Complex Viscosity [Pa·s] |
| 20.00 | 0.16 | 20.00 | 0.63 | 19.90 | 0.75 | 20.10 | 0.50 |
| 18.30 | 0.22 | 18.20 | 0.52 | 18.20 | 0.16 | 18.20 | 0.42 |
| 16.70 | 0.11 | 16.60 | 0.22 | 16.60 | 0.47 | 16.70 | 0.41 |
| 14.90 | 0.68 | 15.00 | 0.57 | 15.10 | 0.30 | 15.10 | 0.32 |
| 13.60 | 0.58 | 13.40 | 0.61 | 13.50 | 0.41 | 13.40 | 0.89 |
| 11.90 | 0.83 | 11.90 | 0.39 | 11.80 | 0.37 | 11.90 | 0.40 |
| 10.20 | 0.35 | 10.30 | 0.52 | 10.40 | 0.81 | 10.20 | 0.39 |
| 8.71 | 0.55 | 8.69 | 0.51 | 8.74 | 0.32 | 8.69 | 0.35 |
| 7.15 | 0.49 | 7.19 | 0.71 | 7.14 | 0.48 | 7.07 | 0.28 |
| 5.52 | 0.79 | 5.52 | 0.83 | 5.53 | 0.74 | 5.60 | 0.76 |
| 4.00 | 0.48 | 4.03 | 0.79 | 3.99 | 0.55 | 3.89 | 0.62 |
| 2.38 | 0.77 | 2.37 | 0.93 | 2.37 | 0.52 | 2.32 | 0.64 |
| 0.80 | 0.55 | 0.76 | 1.00 | 0.85 | 0.74 | 0.78 | 0.58 |
| −0.85 | 0.83 | −0.78 | 0.81 | −0.78 | 0.94 | −0.73 | 0.47 |
| −2.37 | 0.93 | −2.37 | 1.01 | −2.38 | 0.62 | −2.46 | 1.05 |
| −3.93 | 1.25 | −3.95 | 1.05 | −3.97 | 0.94 | −3.97 | 1.19 |
| −5.52 | 1.41 | −5.57 | 0.75 | −5.59 | 0.92 | −5.55 | 1.12 |
| −7.11 | 1.34 | −7.09 | 1.06 | −7.13 | 1.09 | −7.07 | 1.27 |
| −8.72 | 1.57 | −8.69 | 1.05 | −8.66 | 1.39 | −8.73 | 1.48 |
| −10.30 | 1.78 | −10.30 | 1.50 | −10.30 | 1.80 | −10.30 | 1.40 |
| −11.90 | 1.88 | −11.90 | 1.82 | −11.90 | 1.66 | −11.90 | 1.65 |
| −13.40 | 2.09 | −13.50 | 1.79 | −13.50 | 1.91 | −13.50 | 1.92 |
| −15.00 | 2.40 | −15.00 | 1.90 | −15.00 | 1.98 | −15.00 | 2.14 |
| −16.60 | 2.50 | −16.60 | 2.21 | −16.50 | 2.42 | −16.60 | 2.35 |
| −18.20 | 2.73 | −18.20 | 2.58 | −18.20 | 2.61 | −18.20 | 2.62 |
| −19.80 | 3.15 | −19.70 | 2.88 | −19.70 | 2.94 | −19.70 | 2.86 |
| −21.30 | 3.72 | −21.40 | 3.27 | −21.40 | 3.69 | −21.40 | 3.48 |
| −22.90 | 4.03 | −23.00 | 3.66 | −23.00 | 3.68 | −22.90 | 3.87 |
| −24.50 | 4.83 | −24.50 | 4.15 | −24.50 | 4.35 | −24.50 | 4.14 |
| −26.10 | 5.41 | −26.20 | 4.88 | −26.10 | 4.98 | −26.10 | 4.99 |
| −27.70 | 6.24 | −28.50 | 6.22 | −27.70 | 5.52 | −27.70 | 5.70 |
| −29.30 | 7.19 | −29.20 | 6.37 | −29.30 | 6.51 | −29.30 | 6.65 |
| −30.80 | 7.98 | −30.70 | 7.30 | −30.80 | 7.23 | −30.80 | 7.79 |
| −32.40 | 9.33 | −32.30 | 8.32 | −32.40 | 8.43 | −32.40 | 8.91 |
| −34.10 | 10.70 | −34.00 | 9.75 | −34.00 | 10.10 | −34.00 | 10.10 |
| −35.20 | 12.70 | −35.20 | 11.30 | −35.20 | 11.20 | −35.20 | 11.70 |

TABLE 13

| Example 2-Q | | Example 2-R* | | Example 2-S | | Example 2-T | | Ziegler-Natta-based Comparative | |
|---|---|---|---|---|---|---|---|---|---|
| T C | Complex Viscosity [Pa·s] | T C | Complex Viscosity [Pa·s] | T C | Complex Viscosity [Pa·s] | T C | Complex Viscosity [Pa·s] | T C | Complex Viscosity [Pa·s] |
| 20.00 | 1.51 | 20.00 | 1.99 | 20.10 | 0.35 | 20.10 | 1.85 | 20.10 | 0.14 |
| 18.20 | 0.66 | 18.20 | 0.56 | 18.20 | 0.42 | 18.30 | 0.03 | 18.30 | 0.30 |

TABLE 13-continued

| | Example 2-Q | | Example 2-R* | | Example 2-S | | Example 2-T | | Ziegler-Natta-based Comparative | |
|---|---|---|---|---|---|---|---|---|---|---|
| T C | Complex Viscosity [Pa·s] | T C | Complex Viscosity [Pa·s] | T C | Complex Viscosity [Pa·s] | T C | Complex Viscosity [Pa·s] | T C | Complex Viscosity [Pa·s] |
| 16.70 | 0.22 | 16.60 | 0.38 | 16.70 | 0.43 | 16.60 | 0.34 | 16.60 | 0.41 |
| 15.00 | 0.52 | 15.10 | 0.21 | 15.10 | 0.41 | 15.10 | 0.36 | 15.00 | 0.21 |
| 13.50 | 0.30 | 13.50 | 0.63 | 13.50 | 0.44 | 13.40 | 0.37 | 13.50 | 0.48 |
| 11.70 | 0.49 | 11.90 | 0.22 | 11.90 | 0.68 | 11.90 | 0.29 | 11.90 | 0.70 |
| 10.40 | 0.67 | 10.30 | 0.23 | 10.30 | 0.36 | 10.20 | 0.47 | 10.30 | 0.52 |
| 8.76 | 0.49 | 8.75 | 0.28 | 8.76 | 0.33 | 8.69 | 0.31 | 8.76 | 0.47 |
| 7.08 | 0.68 | 7.14 | 0.23 | 7.16 | 0.45 | 7.17 | 0.51 | 7.17 | 0.59 |
| 5.57 | 0.72 | 5.57 | 0.16 | 5.52 | 0.69 | 5.54 | 0.69 | 5.56 | 0.69 |
| 3.96 | 0.85 | 3.97 | 0.37 | 4.00 | 0.56 | 4.06 | 0.86 | 3.94 | 0.70 |
| 2.36 | 0.55 | 2.40 | 0.15 | 2.40 | 0.59 | 2.44 | 1.25 | 2.39 | 0.60 |
| 0.77 | 0.70 | 0.75 | 0.18 | 0.83 | 0.66 | 0.85 | 1.38 | 0.77 | 1.15 |
| −0.79 | 1.06 | −0.75 | 0.50 | −0.74 | 1.03 | −0.85 | 1.26 | −0.76 | 1.01 |
| −2.43 | 0.77 | −2.39 | 0.28 | −2.41 | 0.91 | −2.33 | 1.37 | −2.26 | 1.07 |
| −4.03 | 1.10 | −3.90 | 0.37 | −3.89 | 1.02 | −3.91 | 1.71 | −4.01 | 1.52 |
| −5.49 | 1.31 | −5.51 | 0.42 | −5.50 | 0.99 | −5.52 | 1.78 | −5.50 | 1.71 |
| −7.10 | 1.59 | −7.19 | 0.21 | −7.07 | 1.29 | −7.11 | 1.95 | −7.09 | 1.74 |
| −8.67 | 1.59 | −8.67 | 0.60 | −8.72 | 1.49 | −8.69 | 1.98 | −8.74 | 1.86 |
| −10.30 | 1.93 | −10.30 | 0.39 | −10.20 | 1.49 | −10.30 | 2.41 | −10.20 | 2.60 |
| −11.80 | 2.05 | −11.90 | 0.49 | −11.90 | 1.80 | −11.90 | 2.49 | −11.90 | 2.87 |
| −13.50 | 2.37 | −13.40 | 0.49 | −13.50 | 2.12 | −13.40 | 3.07 | −13.40 | 3.20 |
| −14.90 | 2.41 | −15.10 | 0.48 | −15.00 | 2.25 | −15.10 | 3.24 | −15.00 | 4.24 |
| −16.60 | 2.75 | −16.60 | 0.49 | −16.60 | 2.51 | −16.60 | 3.28 | −16.60 | 4.61 |
| −18.10 | 3.10 | −18.30 | 0.80 | −18.20 | 2.81 | −18.20 | 3.73 | −18.20 | 5.47 |
| −19.70 | 3.48 | −19.80 | 0.87 | −19.80 | 3.27 | −19.70 | 4.50 | −19.80 | 7.11 |
| −21.40 | 3.84 | −21.40 | 0.85 | −21.40 | 3.75 | −21.40 | 4.93 | −21.30 | 7.93 |
| −23.00 | 4.44 | −23.00 | 0.99 | −22.90 | 4.14 | −22.90 | 5.60 | −22.90 | 8.41 |
| −24.50 | 4.96 | −24.50 | 1.09 | −24.50 | 4.93 | −24.60 | 6.15 | −24.60 | 10.00 |
| −26.00 | 5.70 | −26.00 | 1.34 | −26.20 | 5.54 | −26.10 | 7.15 | −26.10 | 11.40 |
| −27.60 | 6.64 | −27.60 | 1.53 | −27.70 | 6.27 | −27.70 | 8.09 | −27.70 | 13.90 |
| −29.20 | 7.31 | −29.20 | 1.48 | −29.30 | 7.09 | −29.40 | 9.43 | −29.20 | 14.80 |
| −30.90 | 8.84 | −30.80 | 2.05 | −30.90 | 8.40 | −30.80 | 10.70 | −30.80 | 17.40 |
| −32.40 | 9.76 | −32.40 | 2.28 | −32.40 | 9.83 | −32.40 | 11.90 | −32.40 | 18.20 |
| −34.00 | 11.60 | −33.90 | 2.80 | −34.00 | 11.30 | −34.00 | 13.60 | −34.00 | 20.80 |
| −35.20 | 12.80 | −35.20 | 2.88 | −35.20 | 12.80 | −35.20 | 16.00 | −35.10 | 24.30 |

*Complex viscosity measured for a 1.0 wt. % concentration in PAO-4.

The samples of compositionally disperse and crystallinity disperse blends and a Ziegler-Natta-based polymeric composition were also investigated for shear stress and strain as shown in Tables 14-18.

Figure 2:
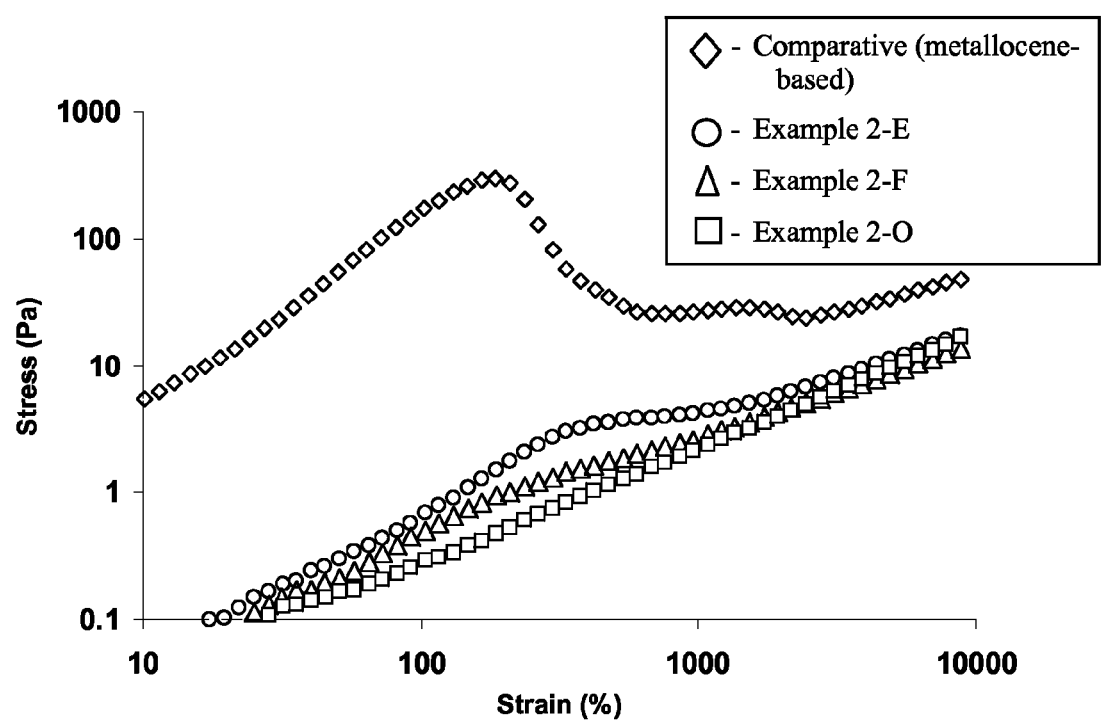
FIG. 2 displays shear stress as a function of strain for the inventive and comparative polymeric compositions in PAO-4 lubrication basestock at −15° C. at a concentration of 2.5 wt. %.

Shear stress as a function of strain for the disperse blends and a metallocene-based polymeric composition is displayed in FIG. 2.

TABLE 14

| Example 2-A | | Example 2-B | | Example 2-C | | Example 2-D | |
|---|---|---|---|---|---|---|---|
| Strain [%] | Shear Stress [Pa] | Strain [%] | Shear Stress [Pa] | Strain [%] | Shear Stress [Pa] | Strain [%] | Shear Stress [Pa] |
| 0.0679 | 0.01 | 0.0785 | 0.02 | 0.0844 | 0.01 | 0.0723 | 0.02 |
| 0.586 | 0.02 | 0.602 | 0.01 | 0.601 | 0.01 | 0.598 | 0.01 |
| 1.42 | 0.02 | 1.43 | 0.02 | 1.43 | 0.02 | 1.44 | 0.01 |
| 2.75 | 0.02 | 2.76 | 0.03 | 2.76 | 0.02 | 2.76 | 0.02 |
| 5.57 | 0.04 | 5.59 | 0.03 | 5.58 | 0.04 | 5.59 | 0.02 |
| 9.37 | 0.04 | 9.38 | 0.05 | 9.38 | 0.05 | 9.37 | 0.05 |
| 15.4 | 0.06 | 15.4 | 0.06 | 15.4 | 0.07 | 15.4 | 0.08 |
| 25.1 | 0.09 | 25.1 | 0.09 | 25.1 | 0.12 | 25.1 | 0.12 |
| 40.5 | 0.13 | 40.5 | 0.12 | 40.5 | 0.18 | 40.5 | 0.19 |
| 65 | 0.19 | 65 | 0.16 | 65 | 0.29 | 65 | 0.30 |
| 104 | 0.26 | 104 | 0.24 | 104 | 0.47 | 104 | 0.52 |
| 167 | 0.43 | 167 | 0.37 | 166 | 0.88 | 166 | 0.91 |
| 266 | 0.65 | 266 | 0.57 | 266 | 1.64 | 266 | 1.34 |
| 424 | 1.00 | 424 | 0.91 | 424 | 2.51 | 424 | 1.74 |
| 677 | 1.52 | 677 | 1.37 | 677 | 3.01 | 677 | 2.22 |
| 1,080 | 2.26 | 1,080 | 2.01 | 1,080 | 3.54 | 1,080 | 2.90 |
| 1,720 | 3.35 | 1,720 | 3.04 | 1,720 | 4.49 | 1,720 | 3.86 |

TABLE 14-continued

| Example 2-A | | Example 2-B | | Example 2-C | | Example 2-D | |
|---|---|---|---|---|---|---|---|
| Strain [%] | Shear Stress [Pa] | Strain [%] | Shear Stress [Pa] | Strain [%] | Shear Stress [Pa] | Strain [%] | Shear Stress [Pa] |
| 2,750 | 5.08 | 2,750 | 4.63 | 2,750 | 6.27 | 2,750 | 5.39 |
| 4,380 | 7.84 | 4,380 | 7.19 | 4,380 | 8.87 | 4,380 | 7.73 |
| 6,980 | 12.20 | 6,980 | 11.20 | 6,980 | 12.60 | 6,980 | 11.20 |
| 7,840 | 13.50 | 7,840 | 12.5 | 7,840 | 13.80 | 7,840 | 12.30 |
| 8,810 | 15.10 | 8,810 | 13.9 | 8,810 | 15.10 | 8,810 | 13.50 |

TABLE 15

| Example 2-E | | Example 2-F | | Example 2-G | | Example 2-H | |
|---|---|---|---|---|---|---|---|
| Strain [%] | Shear Stress [Pa] | Strain [%] | Shear Stress [Pa] | Strain [%] | Shear Stress [Pa] | Strain [%] | Shear Stress [Pa] |
| 0.0805 | 0.00 | 0.0792 | −0.01 | 0.0708 | 0.02 | 0.0773 | 0.01 |
| 0.597 | 0.01 | 0.588 | 0.00 | 0.597 | 0.02 | 0.603 | 0.01 |
| 1.43 | 0.01 | 1.42 | 0.01 | 1.43 | 0.03 | 1.43 | 0.02 |
| 2.76 | 0.02 | 2.75 | 0.01 | 2.76 | 0.03 | 2.76 | 0.02 |
| 5.58 | 0.03 | 5.55 | 0.04 | 5.57 | 0.04 | 5.58 | 0.03 |
| 9.36 | 0.06 | 9.35 | 0.05 | 9.37 | 0.06 | 9.38 | 0.05 |
| 15.4 | 0.09 | 15.4 | 0.07 | 15.4 | 0.08 | 15.4 | 0.07 |
| 25.1 | 0.15 | 25.1 | 0.11 | 25.1 | 0.12 | 25.1 | 0.11 |
| 40.4 | 0.24 | 40.4 | 0.17 | 40.5 | 0.17 | 40.5 | 0.18 |
| 65 | 0.39 | 65 | 0.28 | 65 | 0.24 | 65 | 0.27 |
| 104 | 0.69 | 104 | 0.51 | 104 | 0.36 | 104 | 0.41 |
| 166 | 1.27 | 166 | 0.84 | 166 | 0.55 | 166 | 0.65 |
| 266 | 2.40 | 266 | 1.23 | 266 | 0.86 | 266 | 0.94 |
| 424 | 3.45 | 424 | 1.65 | 424 | 1.28 | 424 | 1.31 |
| 677 | 3.90 | 677 | 2.15 | 677 | 1.90 | 677 | 1.81 |
| 1,080 | 4.36 | 1,080 | 2.84 | 1,080 | 2.73 | 1,080 | 2.59 |
| 1,720 | 5.37 | 1,720 | 3.92 | 1,720 | 3.92 | 1,720 | 3.70 |
| 2,750 | 7.35 | 2,750 | 5.51 | 2,750 | 5.72 | 2,750 | 5.32 |
| 4,380 | 10.30 | 4,380 | 7.84 | 4,380 | 8.43 | 4,380 | 7.72 |
| 6,980 | 14.60 | 6,980 | 11.30 | 6,980 | 12.50 | 6,980 | 11.30 |
| 7,840 | 15.90 | 7,840 | 12.50 | 7,840 | 13.80 | 7,840 | 12.5 |
| 8,810 | 17.30 | 8,810 | 13.70 | 8,810 | 15.20 | 8,810 | 13.8 |

TABLE 16

| Example 2-I | | Example 2-J | | Example 2-K* | | Example 2-L | |
|---|---|---|---|---|---|---|---|
| Strain [%] | Shear Stress [Pa] | Strain [%] | Shear Stress [Pa] | Strain [%] | Shear Stress [Pa] | Strain [%] | Shear Stress [Pa] |
| 0.0703 | −0.01 | 0.072 | 0.00 | 0.0673 | 0.02 | 0.0657 | 0.01 |
| 0.593 | 0.00 | 0.595 | 0.00 | 0.594 | 0.01 | 0.589 | 0.01 |
| 1.42 | 0.01 | 1.43 | 0.01 | 1.43 | 0.01 | 1.42 | 0.03 |
| 2.75 | 0.02 | 2.76 | 0.01 | 2.76 | 0.02 | 2.75 | 0.02 |
| 5.57 | 0.01 | 5.57 | 0.03 | 5.59 | 0.02 | 5.57 | 0.03 |
| 9.37 | 0.03 | 9.37 | 0.04 | 9.39 | 0.01 | 9.37 | 0.05 |
| 15.4 | 0.05 | 15.4 | 0.06 | 15.5 | 0.02 | 15.4 | 0.06 |
| 25.1 | 0.07 | 25.1 | 0.09 | 25.1 | 0.03 | 25.1 | 0.09 |
| 40.5 | 0.12 | 40.5 | 0.13 | 40.5 | 0.03 | 40.5 | 0.12 |
| 65 | 0.19 | 65 | 0.21 | 65.1 | 0.04 | 65 | 0.20 |
| 104 | 0.29 | 104 | 0.33 | 104 | 0.08 | 104 | 0.29 |
| 166 | 0.41 | 166 | 0.50 | 167 | 0.10 | 166 | 0.47 |
| 266 | 0.65 | 266 | 0.79 | 266 | 0.16 | 266 | 0.73 |
| 424 | 1.00 | 424 | 1.14 | 425 | 0.25 | 424 | 1.11 |
| 677 | 1.44 | 677 | 1.64 | 677 | 0.38 | 677 | 1.68 |
| 1,080 | 2.13 | 1,080 | 2.41 | 1,080 | 0.60 | 1,080 | 2.55 |
| 1,720 | 3.16 | 1,720 | 3.53 | 1,720 | 0.94 | 1,720 | 3.85 |
| 2,750 | 4.77 | 2,750 | 5.22 | 2,750 | 1.47 | 2,750 | 5.94 |
| 4,380 | 7.14 | 4,380 | 7.81 | 4,380 | 2.31 | 4,380 | 9.16 |
| 6,980 | 10.90 | 6,980 | 11.70 | 6,980 | 3.69 | 6,980 | 14.20 |
| 7,840 | 12.00 | 7,840 | 13.00 | 7,850 | 4.15 | 7,840 | 15.80 |
| 8,810 | 13.40 | 8,810 | 14.40 | 8,820 | 4.64 | 8,810 | 17.70 |

*Shear stress and strain measured for a 1.0 wt. % concentration in PAO-4.

TABLE 17

| Example 2-M | | Example 2-N | | Example 2-O | | Example 2-P | |
|---|---|---|---|---|---|---|---|
| Strain [%] | Shear Stress [Pa] | Strain [%] | Shear Stress [Pa] | Strain [%] | Shear Stress [Pa] | Strain [%] | Shear Stress [Pa] |
| 0.0758 | 0.02 | 0.0752 | 0.00 | 0.0683 | 0.03 | 0.0673 | 0.02 |
| 0.593 | 0.03 | 0.59 | 0.02 | 0.596 | 0.02 | 0.584 | 0.03 |
| 1.42 | 0.04 | 1.43 | 0.02 | 1.43 | 0.02 | 1.42 | 0.03 |
| 2.75 | 0.04 | 2.76 | 0.02 | 2.76 | 0.03 | 2.75 | 0.03 |
| 5.58 | 0.05 | 5.58 | 0.03 | 5.58 | 0.04 | 5.58 | 0.03 |
| 9.37 | 0.06 | 9.38 | 0.04 | 9.38 | 0.06 | 9.37 | 0.05 |
| 15.4 | 0.08 | 15.4 | 0.05 | 15.4 | 0.08 | 15.4 | 0.07 |
| 25.1 | 0.10 | 25.1 | 0.08 | 25.1 | 0.09 | 25.1 | 0.09 |
| 40.5 | 0.15 | 40.5 | 0.10 | 40.5 | 0.14 | 40.5 | 0.13 |
| 65 | 0.23 | 65 | 0.15 | 65 | 0.19 | 65 | 0.17 |
| 104 | 0.34 | 104 | 0.25 | 104 | 0.29 | 104 | 0.28 |
| 166 | 0.52 | 167 | 0.39 | 167 | 0.41 | 167 | 0.41 |
| 266 | 0.80 | 266 | 0.61 | 266 | 0.67 | 266 | 0.64 |
| 424 | 1.22 | 424 | 0.97 | 424 | 1.03 | 424 | 0.97 |
| 677 | 1.87 | 677 | 1.53 | 677 | 1.57 | 677 | 1.51 |
| 1,080 | 2.80 | 1,080 | 2.39 | 1,080 | 2.36 | 1,080 | 2.38 |
| 1,720 | 4.13 | 1,720 | 3.77 | 1,720 | 3.60 | 1,720 | 3.72 |
| 2,750 | 6.17 | 2,750 | 5.98 | 2,750 | 5.54 | 2,750 | 5.82 |
| 4,380 | 9.48 | 4,380 | 9.41 | 4,380 | 8.60 | 4,380 | 9.19 |
| 6,980 | 14.60 | 6,980 | 14.90 | 6,980 | 13.40 | 6,980 | 14.40 |
| 7,840 | 16.30 | 7,840 | 16.7 | 7,840 | 14.90 | 7,840 | 16.20 |
| 8,810 | 18.10 | 8,810 | 18.7 | 8,810 | 16.70 | 8,810 | 18.10 |

TABLE 18

| Example 2-Q | | Example 2-R* | | Example 2-S | | Example 2-T | | Ziegler-Natta-based Comparative | |
|---|---|---|---|---|---|---|---|---|---|
| Strain [%] | Shear Stress [Pa] | Strain [%] | Shear Stress [Pa] | Strain [%] | Shear Stress [Pa] | Strain [%] | Shear Stress [Pa] | Strain [%] | Shear Stress [Pa] |
| 0.0755 | 0.01 | 0.0625 | 0.02 | 0.0743 | 0.01 | 0.0756 | 0.01 | 0.0741 | 0.00 |
| 0.594 | 0.01 | 0.589 | 0.02 | 0.592 | 0.02 | 0.61 | 0.00 | 0.598 | 0.00 |
| 1.43 | 0.00 | 1.42 | 0.03 | 1.42 | 0.03 | 1.44 | 0.01 | 1.42 | 0.02 |
| 2.76 | 0.01 | 2.75 | 0.04 | 2.76 | 0.03 | 2.76 | 0.01 | 2.75 | 0.02 |
| 5.58 | 0.02 | 5.58 | 0.02 | 5.58 | 0.03 | 5.58 | 0.03 | 5.57 | 0.03 |
| 9.38 | 0.02 | 9.38 | 0.03 | 9.37 | 0.05 | 9.37 | 0.05 | 9.36 | 0.05 |
| 15.4 | 0.05 | 15.4 | 0.04 | 15.4 | 0.06 | 15.4 | 0.06 | 15.4 | 0.09 |
| 25.1 | 0.09 | 25.1 | 0.03 | 25.1 | 0.10 | 25.1 | 0.11 | 25.1 | 0.14 |
| 40.5 | 0.13 | 40.5 | 0.04 | 40.5 | 0.12 | 40.5 | 0.16 | 40.4 | 0.22 |
| 65 | 0.19 | 65.1 | 0.06 | 65 | 0.19 | 65 | 0.24 | 65 | 0.37 |
| 104 | 0.30 | 104 | 0.09 | 104 | 0.28 | 104 | 0.39 | 104 | 0.66 |
| 166 | 0.49 | 167 | 0.15 | 167 | 0.46 | 166 | 0.61 | 166 | 1.28 |
| 266 | 0.74 | 266 | 0.18 | 266 | 0.71 | 266 | 0.99 | 266 | 2.21 |
| 424 | 1.17 | 425 | 0.28 | 424 | 1.08 | 424 | 1.50 | 424 | 2.89 |
| 677 | 1.79 | 677 | 0.44 | 677 | 1.64 | 677 | 2.15 | 677 | 3.28 |
| 1,080 | 2.63 | 1,080 | 0.68 | 1,080 | 2.54 | 1,080 | 3.06 | 1,080 | 3.86 |
| 1,720 | 3.91 | 1,720 | 1.04 | 1,720 | 3.92 | 1,720 | 4.33 | 1,720 | 4.97 |
| 2,750 | 5.92 | 2,750 | 1.68 | 2,750 | 6.08 | 2,750 | 6.24 | 2,750 | 6.83 |
| 4,380 | 9.12 | 4,380 | 2.61 | 4,380 | 9.49 | 4,380 | 9.29 | 4,380 | 9.59 |
| 6,980 | 14.10 | 6,980 | 4.11 | 6,980 | 14.80 | 6,980 | 14.10 | 6,980 | 13.70 |
| 7,840 | 15.70 | 7,850 | 4.61 | 7,840 | 16.60 | 7,840 | 15.70 | 7,840 | 15.00 |
| 8,810 | 17.60 | 8,820 | 5.19 | 8,810 | 18.50 | 8,810 | 17.50 | 8,810 | 16.40 |

*Shear stress and strain measured for a 1.0 wt. % concentration in PAO-4.

These above data demonstrate that polymer compositions of the present invention can be processed into lubricant formulations having properties similar to those of formulations made from components prepared by more complex and more expensive multi-step methods.

Exemplary embodiments of the invention are provided as follows:

(1) A polymeric composition comprising:
  (a) a first ethylene copolymer having:
    i. an $E_A$ in the range from greater than or equal to 35 to less than or equal to 60; and
    ii. a $Mw_A$ of less than 130,000; and
  (b) a second ethylene copolymer having:
    i. an $E_B$ in the range from greater than or equal to 35 to less than or equal to 85; and
    ii. a $Mw_B$ of less than 70,000.

(2) The polymeric composition of embodiment (1), wherein the first ethylene copolymer and/or the second ethylene copolymer have a substantially linear structure.

(3) The polymeric composition of embodiment (1) or (2), wherein the first ethylene copolymer and/or the second ethylene copolymer have a MWD of about 2.4 or less.

(4) The polymeric composition of any one of embodiments (1)-(3), wherein the MWD of the first ethylene copolymer is in the range from greater than or equal to 1.80 to less than or equal to 1.95, and/or wherein the MWD of the second ethylene copolymer is in the range from greater than or equal to 1.80 to less than or equal to 1.95. (5) The polymeric composition of any one of embodiments (1)-(4), wherein $E_A$ is less than $E_B$ for the polymeric composition, and/or wherein the difference between $E_B$ and $E_A$ is greater than or equal to 5.

(6) The polymeric composition of any one of embodiments (1)-(5), wherein $MI_A/MI_B$ is less than or equal to 3.0 for the polymeric composition.

(7) The polymeric composition of any one of embodiments (1)-(6), wherein the weight percent of the first ethylene copolymer in the polymeric composition is greater than the weight percent of the second ethylene copolymer in the polymeric composition.

(8) The polymeric composition of any one of embodiments (1)-(7), wherein the $Mw_A$ is less than 90,000 and/or the $Mw_B$ is less than 60,000.

(9) The polymeric composition of any one of embodiments (1)-(8), wherein the first and/or second ethylene copolymers comprises ethylene and a comonomer selected from the group consisting of propylene, butene, hexene, octene, and mixtures thereof.

(10) The polymeric composition of embodiment (9), wherein the comonomer of the first and/or the second ethylene copolymers further comprises a polyene monomer, and the polymeric composition further comprises up to 5 mole % polyene-derived units.

(11) A lubrication oil composition comprising:
(a) a lubrication oil basestock, and
(b) the polymeric composition of any one of the preceding embodiments.

(12) The lubrication oil composition of embodiment (11) having at least one of: (a) a TE of greater than or equal to 1.5; (b) a SSI of less than 55; and (c) a complex viscosity at −31° C. of less than or equal to 500 cSt.

(13) A process for making a polymeric composition comprising the steps of:
(a) copolymerizing ethylene and a first comonomer component in the presence of a first metallocene catalyst in a first polymerization reaction zone under first polymerization conditions to produce a first effluent comprising the first ethylene copolymer of any one of the preceding embodiments;
(b) copolymerizing ethylene and a second comonomer component in the presence of a second metallocene catalyst in a second polymerization reaction zone under second polymerization conditions to produce a second effluent comprising the second ethylene copolymer of any one of the preceding embodiments; and
(c) forming the polymeric composition of any one of the preceding embodiments,
wherein the first and second polymerization conditions are independently selected from the group consisting of slurry phase, solution phase and bulk phase; and wherein the first and second polymerization reaction zones are in series, in parallel or the same.

(14) A polymeric composition comprising:
(a) a first ethylene copolymer having:
  i. an $H_A$ in the range from greater than or equal to 0 to less than or equal to 30; and
  ii. a $Mw_A$ of less than 130,000; and
(b) a second ethylene copolymer having:
  i. an $H_B$ in the range from greater than 30 to less than or equal to 60; and
  ii. a $Mw_B$ of less than 70,000.

(15) The polymeric composition of embodiment (14), wherein the first ethylene copolymer and/or the second ethylene copolymer have a substantially linear structure.

(16) The polymeric composition of embodiment (14) or (15), wherein the first ethylene copolymer and/or the second ethylene copolymer have a MWD of about 2.4 or less.

(17) The polymeric composition of any one of embodiments (14)-(16), wherein MWD of the first ethylene copolymer is in the range from greater than or equal to 1.80 to less than or equal to 1.95, and/or wherein MWD of the second ethylene copolymer is in the range from greater than or equal to 1.80 to less than or equal to 1.95.

(18) The polymeric composition of any one of embodiments (14)-(17), wherein $H_A$ is less than $H_B$ for the polymeric composition.

(19) The polymeric composition of any one of embodiments (14)-(18), wherein $H_A$ is in the range from greater than or equal to 0 to less than or equal to 10.

(20) The polymeric composition of any one of embodiments (14)-(19), wherein $MI_A/MI_B$ is less than or equal to 3.0.

(21) The polymeric composition of any one of embodiments (14)-(20), wherein the weight percent of the first ethylene copolymer in the polymeric composition is greater than the weight percent of the second ethylene copolymer in the polymeric composition.

(22) The polymeric composition of any one of embodiments (14)-(21), wherein the $Mw_A$ is less than 90,000 and/or the $Mw_B$ is less than 60,000.

(23) The polymeric composition of any one of embodiments (14)-(22), wherein the first and/or second ethylene copolymers comprises ethylene and a comonomer selected from the group consisting of propylene, butene, hexene, octene, and mixtures thereof.

(24) A lubrication oil composition comprising:
(a) a lubrication oil basestock; and
(b) the polymeric composition of any one of embodiments (14)-(23).

(25) A process for making a polymeric composition comprising the steps of:
(a) copolymerizing ethylene and a first comonomer component in the presence of a first metallocene catalyst in a first polymerization reaction zone under first polymerization conditions to produce a first effluent comprising the first ethylene copolymer of any one of embodiments (14)-(23);
(b) copolymerizing ethylene and a second comonomer component in the presence of a second metallocene catalyst in a second polymerization reaction zone under second polymerization conditions to produce a second effluent comprising the second ethylene copolymer of any one of embodiments (14)-(23); and
(c) forming the polymeric composition of any one of embodiments (14)-(23),
wherein the first and second polymerization conditions are independently selected from the group consisting of slurry phase, solution phase and bulk phase; and wherein the first and second polymerization reaction zones are in series, in parallel or the same.

When numerical lower limits and numerical upper limits are listed herein, ranges from any lower limit to any upper limit are contemplated.

All references, patents and documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A polymeric composition comprising:
   (a) a first ethylene copolymer having:
      i. an $E_A$ in the range from greater than or equal to 35 to less than or equal to 60;
      ii. a $Mw_A$ of less than 130,000; and
      iii. An $H_A$ in the range of greater than or equal to 0 to less than or equal to 30 J/g; and
   (b) a second ethylene copolymer having:
      i. an $E_B$ in the range from greater than or equal to 35 to less than or equal to 85;
      ii. a $Mw_B$ of less than 70,000; and
      iii. An $H_B$ in the range of greater than 30 J/g to less than or equal to 60 J/g, wherein $MI_A/MI_B$ is less than or equal to 3.0 for the polymeric composition.

2. The polymeric composition of claim 1, wherein the first ethylene copolymer and/or the second ethylene copolymer have a substantially linear structure.

3. The polymeric composition of claim 1, wherein the first ethylene copolymer and/or the second ethylene copolymer have a MWD of about 2.4 or less.

4. The polymeric composition of claim 1, wherein the MWD of the first ethylene copolymer is in the range from greater than or equal to 1.80 to less than or equal to 1.95, and/or wherein the MWD of the second ethylene copolymer is in the range from greater than or equal to 1.80 to less than or equal to 1.95.

5. The polymeric composition of claim 1, wherein $E_A$ is less than $E_B$ for the polymeric composition, and/or wherein the difference between $E_B$ and $E_A$ is greater than or equal to 5.

6. The polymeric composition of claim 1, wherein $MI_A/MI_B$ is less than or equal to 2.5 for the polymeric composition.

7. The polymeric composition of claim 1, wherein the weight percent of the first ethylene copolymer in the polymeric composition is greater than the weight percent of the second ethylene copolymer in the polymeric composition.

8. The polymeric composition of claim 1, wherein the $Mw_A$ is less than 90,000 and/or the $Mw_B$ is less than 60,000.

9. The polymeric composition of claim 1, wherein the first and/or second ethylene copolymers comprises ethylene and a comonomer selected from the group consisting of propylene, butene, hexene, octene, and mixtures thereof 10. The polymeric composition of claim 1, wherein the comonomer of the first and/or the second ethylene copolymers further comprises a polyene monomer, and the polymeric composition further comprises up to 5 mole % polyene-derived units.

11. A lubrication oil composition comprising:
    (a) a lubrication oil basestock; and
    (b) the polymeric composition of claim 1.

12. The lubrication oil composition of claim 11 having at least one of: (a) a TE of greater than or equal to 1.5; (b) a SSI of less than 55; and (c) a complex viscosity at −31° C. of less than or equal to 500 cSt.

13. A process for making a polymeric composition comprising the steps of:
    (a) copolymerizing ethylene and a first comonomer component in the presence of a first metallocene catalyst in a first polymerization reaction zone under first polymerization conditions to produce a first effluent comprising the first ethylene copolymer of claim 1;
    (b) copolymerizing ethylene and a second comonomer component in the presence of a second metallocene catalyst in a second polymerization reaction zone under second polymerization conditions to produce a second effluent comprising the second ethylene copolymer of claim 1; and
    (c) forming the polymeric composition of claim 1,
    wherein the first and second polymerization conditions are independently selected from the group consisting of slurry phase, solution phase and bulk phase; and
    wherein the first and second polymerization reaction zones are in series, in parallel or the same.

14. The polymeric composition of claim 1, wherein $H_A$ is less than $H_B$ for the polymeric composition.

15. The polymeric composition of claim 1, wherein $H_A$ is in the range from greater than or equal to 0 to less than or equal to 10.

16. A rheology modifier for lubricators, comprising:
    a physical blend comprising:
    (a) a first ethylene copolymer having:
       (i) an $E_A$ of 35 to 60;
       (ii) a $Mw_A$ of 70,000 to 95,000; and
       (iii) an $H_A$ of 0 J/g to 15 J/g; and
    (b) a second ethylene copolymer having:
       (i) an $E_B$ of 45 to 75;
       (ii) a $Mw_B$ of 75,000 or less; and
       (iii) an $H_B$ of 30 J/g to 60 J/g,
    wherein $E_B$ is greater than $E_A$ and the physical blend has a $MI_A/MI_B$ of 3.0 or less.

17. The rheology modifier of claim 16, wherein the difference between $E_B$ and $E_A$ is 10 or more.

18. The rheology modifier of claim 16, wherein $Mw_B$ is 65,000 to 75,000.

19. The rheology modifier of claim 16, wherein the first ethylene copolymer and/or the second ethylene copolymer have a substantially linear structure, and wherein the MWD of the first ethylene copolymer is less than 3.0, and the MWD of the second ethylene copolymer is 1.80 to 1.95.

20. The rheology modifier of claim 16, wherein the difference between $E_B$ and $E_A$ is greater than or equal to 5, and wherein $MI_A/MI_B$ is less than or equal to 2.5 for the polymeric composition.

21. The rheology modifier of claim 16, wherein the first and/or second ethylene copolymers comprises ethylene and a comonomer selected from the group consisting of propylene, butene, hexene, octene, and mixtures thereof.

22. The rheology modifier of claim 16, wherein the comonomer of the first and/or the second ethylene copolymers further comprises a polyene monomer, and the polymeric composition further comprises up to 5 mole % polyene-derived units.

23. A lubrication oil composition comprising:
    (a) a lubrication oil basestock; and
    (b) the rheology modifier of claim 16.

24. The lubrication oil composition of claim 23, wherein the composition comprises at least one of: (a) a TE of greater than or equal to 1.5; (b) a SSI of less than 55; and (c) a complex viscosity at −31° C. of less than or equal to 500 cSt.

25. A process for making a rheology modifier of claim 16, comprising:
    (a) copolymerizing ethylene and a first comonomer component in the presence of a first metallocene catalyst in a first polymerization reaction zone under first polymerization conditions to produce a first effluent comprising the first ethylene copolymer of claim 16;
    (b) copolymerizing ethylene and a second comonomer component in the presence of a second metallocene catalyst in a second polymerization reaction zone under second polymerization conditions to produce a second effluent comprising the second ethylene copolymer of claim 16; and
    (c) physically blending the first and second ethylene copolymers to form the rheology modifier of claim 16,
    wherein the first and second polymerization conditions are independently selected from the group consisting of slurry phase, solution phase and bulk phase.

* * * * *

UNITED STATES PATENT AND TRADEMARK OFFICE
CERTIFICATE OF CORRECTION

PATENT NO.       : 8,389,452 B2
APPLICATION NO.  : 12/762096
DATED            : March 5, 2013
INVENTOR(S)      : Sudhin Datta et al.

It is certified that error appears in the above-identified patent and that said Letters Patent is hereby corrected as shown below:

On the Title page of the patent, in item 60, Related U.S. Application Data, please delete "provisional application No. 61/299,816, filed on Jan. 29, 2010, provisional application No. 61/297,621, filed on Jan. 22, 2010" and insert --application No. 12/569,009, filed Sept. 29, 2009--.

In the Specification

In Column 1, Line 16, please delete "61/299,816" and insert --61/298,816--.

Signed and Sealed this
Twelfth Day of May, 2015

Michelle K. Lee
*Director of the United States Patent and Trademark Office*